(12) United States Patent
Pomerleau

(10) Patent No.: US 9,359,840 B2
(45) Date of Patent: Jun. 7, 2016

(54) SYSTEMS AND METHODS FOR DRYING DRILL CUTTINGS

(71) Applicant: Pomerleau Mechanica Inc., Calgary (CA)

(72) Inventor: Daniel Guy Pomerleau, Calgary (CA)

(73) Assignee: Pomerleau Mechanica Inc., Calgary (CA)

( * ) Notice: Subject to any disclaimer, the term of this patent is extended or adjusted under 35 U.S.C. 154(b) by 0 days.

(21) Appl. No.: 13/674,732

(22) Filed: Nov. 12, 2012

(65) Prior Publication Data

US 2013/0092637 A1  Apr. 18, 2013

Related U.S. Application Data

(63) Continuation of application No. PCT/CA2011/000542, filed on May 11, 2011.

(60) Provisional application No. 61/417,390, filed on Nov. 26, 2010, provisional application No. 61/411,298, filed on Nov. 8, 2010, provisional application No. 61/334,117, filed on May 12, 2010.

(51) Int. Cl.
  *B07B 1/46* (2006.01)
  *E21B 21/06* (2006.01)
  *B07B 13/16* (2006.01)
  *B01D 21/26* (2006.01)

(52) U.S. Cl.
  CPC ............. *E21B 21/065* (2013.01); *B07B 1/46* (2013.01); *B07B 13/16* (2013.01); *B01D 21/262* (2013.01)

(58) Field of Classification Search
  CPC ......... E21B 21/065; B07B 1/46; B07B 13/16; B07B 1/4645; B01D 21/262

USPC .......... 209/255, 311, 314, 318, 321; 210/780, 210/239, 324, 459, 257.1, 195.1, 85, 240, 210/388, 188
  See application file for complete search history.

(56) References Cited

U.S. PATENT DOCUMENTS

| 2,161,500 A | 6/1939 | Bird et al. |
| 2,462,878 A * | 3/1949 | Logue .......................... 209/269 |
| 3,929,642 A | 12/1975 | Ennis et al. |

(Continued)

FOREIGN PATENT DOCUMENTS

| CA | 970724 A | 7/1975 |
| CA | 2664173 A1 | 4/2008 |

(Continued)

OTHER PUBLICATIONS

International Search Report Application No. PCT/CA2011/000542 Completed: Sep. 21, 2011 Mailing Date: Oct. 25, 2011 4 pages.

(Continued)

*Primary Examiner* — Joseph C Rodriguez
*Assistant Examiner* — Kalyanavenkateshware Kumar
(74) *Attorney, Agent, or Firm* — Whitmyer IP Group LLC

(57) ABSTRACT

Systems and methods for separating fluids from drill cuttings, specifically, shakers that incorporate modifications including vacuum systems and/or partitions and methods of operating such shakers to affect a high degree of fluid separation. The systems and methods are effective across a variety of screen sizes, vacuum flows and vacuum designs. The systems are also particularly effective in assisting in the separation of gases from drilling fluids.

26 Claims, 22 Drawing Sheets

(56) References Cited

U.S. PATENT DOCUMENTS

| | | |
|---|---|---|
| 3,970,552 A | 7/1976 | Bongert |
| 4,298,572 A | 11/1981 | Moffet et al. |
| 4,350,591 A | 9/1982 | Lee |
| 4,397,659 A | 8/1983 | Gowan et al. |
| 4,492,862 A | 1/1985 | Grynberg et al. |
| 4,546,783 A | 10/1985 | Lott |
| 4,635,735 A | 1/1987 | Crownover |
| 4,639,258 A | 1/1987 | Schellstede et al. |
| 4,725,352 A | 2/1988 | Haliotis |
| 4,750,920 A | 6/1988 | Manuel et al. |
| 5,098,586 A | 3/1992 | Rudolph |
| 5,341,882 A | 8/1994 | Hale |
| 5,431,882 A | 7/1995 | Nokihara et al. |
| 6,092,390 A | 7/2000 | Griffith, Jr. |
| 6,164,380 A | 12/2000 | Davis |
| 6,170,580 B1 | 1/2001 | Reddoch |
| 6,389,818 B2 | 5/2002 | Cho |
| 6,389,878 B1 | 5/2002 | Zamfes |
| 6,607,659 B2 | 8/2003 | Hensley et al. |
| 7,096,942 B1 | 8/2006 | de Rouffignac et al. |
| 7,740,761 B2 * | 6/2010 | Bailey ............ 209/254 |
| 7,767,628 B2 | 8/2010 | Kippie et al. |
| 8,394,270 B2 | 3/2013 | Vasshus et al. |
| 8,613,360 B2 | 12/2013 | Carr |
| 9,004,288 B2 | 4/2015 | Carr |
| 9,074,440 B2 | 7/2015 | Carr |
| 2002/0056667 A1 | 5/2002 | Baltzer et al. |
| 2003/0131700 A1 | 7/2003 | Balz et al. |
| 2004/0154963 A1 | 8/2004 | Rayborn |
| 2005/0054623 A1 | 3/2005 | Dudley |
| 2005/0082236 A1 | 4/2005 | Derrick et al. |
| 2005/0183994 A1 | 8/2005 | Hensley et al. |
| 2006/0016768 A1 | 1/2006 | Grichar et al. |
| 2006/0113220 A1 | 6/2006 | Scott et al. |
| 2006/0254421 A1 | 11/2006 | Boone |
| 2007/0245839 A1 | 10/2007 | Rieberer |
| 2008/0078699 A1 | 4/2008 | Carr |
| 2008/0078700 A1 | 4/2008 | Jones et al. |
| 2010/0012556 A1 | 1/2010 | Pohle |
| 2011/0284481 A1 * | 11/2011 | Pomerleau ............ 210/785 |
| 2012/0279932 A1 | 11/2012 | Pomerleau |
| 2013/0074360 A1 | 3/2013 | Pomerleau |
| 2014/0091028 A1 | 4/2014 | Pomerleau |
| 2015/0204151 A1 | 7/2015 | Pomerleau |

FOREIGN PATENT DOCUMENTS

| | | |
|---|---|---|
| CA | 2712774 A1 | 11/2010 |
| CN | 101553322 A | 10/2009 |
| GB | 2089403 A | 6/1982 |
| RU | 2021038 C1 | 10/1994 |
| SU | 99315 A1 | 11/1953 |
| SU | 297691 | 3/1971 |
| SU | 391868 A1 | 7/1973 |
| SU | 1260505 A1 | 9/1986 |
| WO | 2005054623 A1 | 6/2005 |
| WO | 2008042860 A2 | 4/2008 |
| WO | 2010048718 A1 | 5/2010 |
| WO | 2011113132 A1 | 9/2011 |

OTHER PUBLICATIONS

Document from Impeachment Proceedings Related to Canadian Patent No. 2,712,774; Reply to Defence and Counterclaim dated Feb. 21, 2013; 7 pages.

Document from Impeachment Proceedings Related to Canadian Patent No. 2,712,774; Statement of Claim dated Oct. 26, 2012; 82 pages.

Document from Impeachment Proceedings Related to Canadian Patent No. 2,712,774; Statement of Defence and Counterclaim dated Dec. 21, 2012; 13 pages.

Office Action from Russia Application No. 2011 120 971 Dec. 19, 2013 12 pages (translation included).

Office Action & English Translation Russian Patent Application No. 2011120971 May 8, 2013.

Second Office Action from China Application No. 201080066711.9 Issued: Feb. 9, 2015 21 pages.

Office Action from Russia Application No. 2012 153 393 Apr. 28, 2015 7 pages (translation included).

Australian Office Action Australian Application No. 2009310586 Isssued: Feb. 12, 2016 5 pages.

* cited by examiner

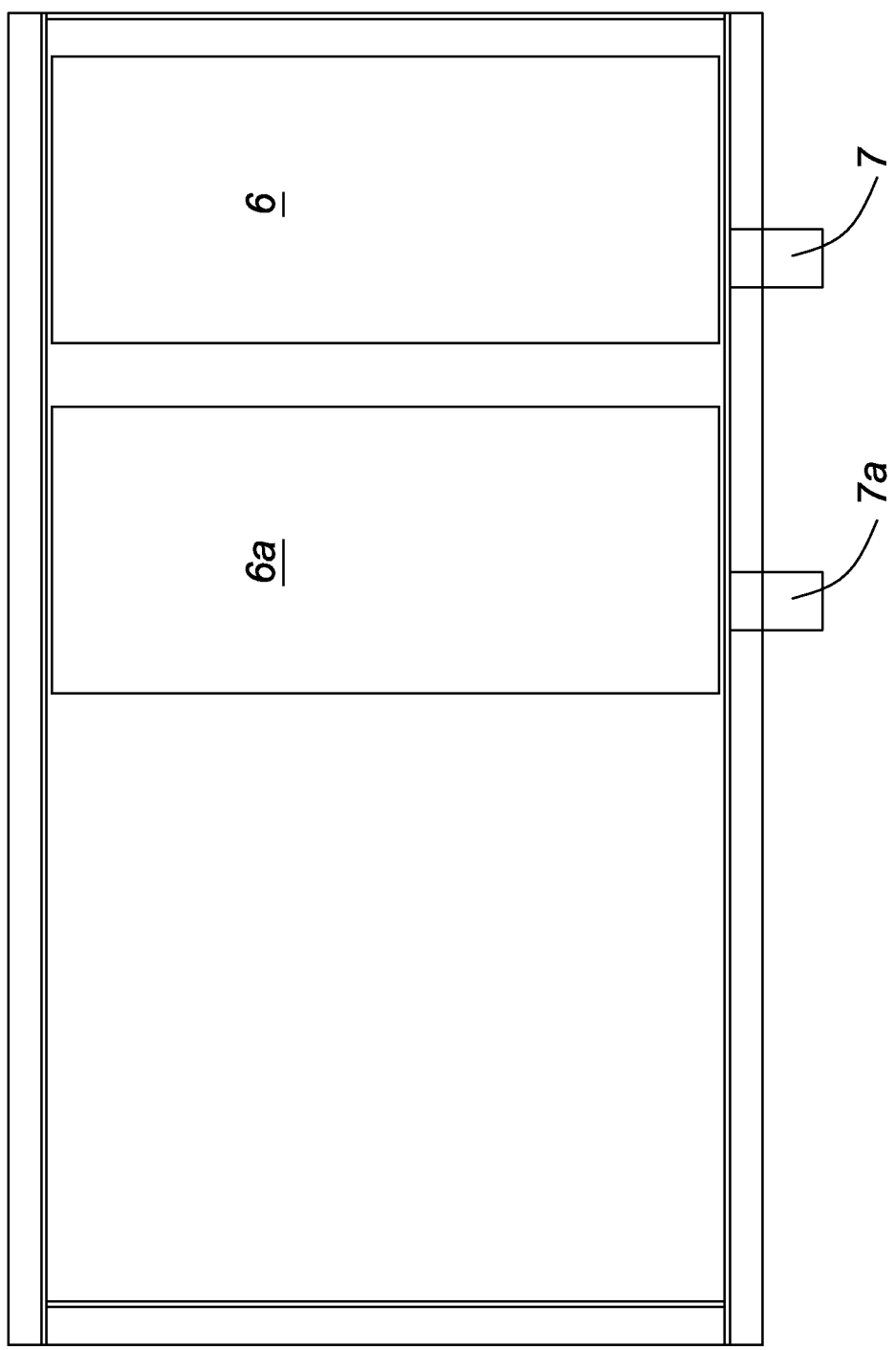

SYSTEMS AND METHODS FOR DRYING DRILL CUTTINGS

FIELD OF THE INVENTION

This application describes systems and methods for separating fluids from drill cuttings. Specifically, the invention relates to shakers that incorporate modifications including vacuum systems and/or partitions and methods of operating such shakers to affect a high degree of fluid separation. The system and methods are effective across a variety of screen sizes, vacuum flows and vacuum designs. The system is also particularly effective in assisting in the separation of gases from drilling fluids.

BACKGROUND OF THE INVENTION

The loss of drilling fluids presents several technological and cost challenges to the energy exploration industry. These challenges generally include the seepage losses of drilling fluids to the formation, the recovery of drilling fluids at surface and/or the disposal of drilling detritus or cuttings that are contaminated with drilling fluid. In the context of this description, "drilling fluid" is both fluid prepared at surface used in an unaltered state for drilling as well as all fluids recovered from a well that may include various contaminants from the well including water and hydrocarbons (both liquid and gas).

As is known, and by way of background, during the excavation or drilling process, drilling fluid losses can reach levels approaching 300 cubic meters of lost drilling fluid over the course of a drilling program. With some drilling fluids having values in excess of $1600 per cubic meter, the loss of such volumes of fluids represents a substantial cost to drill operators.

Drilling fluids are generally characterized as either "water-based" or "oil-based" drilling fluids that may include many expensive and specialized chemicals as known to those skilled in the art. As a result, it is desirable that minimal quantities of drilling fluids are lost during a drilling program such that many technologies have been considered and/or employed to minimize drilling fluid losses both downhole and at surface.

Additionally, in some areas the delivery of oil or water for the formulation of drilling fluids can present several costly challenges for some operations; specifically desert, offshore and even some districts where communities will not allow allocation of water for this use.

As noted above, one particular problem is the separation of drilling fluid and any hydrocarbons from the formation that may be adhered to the drill cuttings (collectively "fluids") at the surface. The effective separation of various fluids from drill cuttings has been achieved by various technologies including but not limited to; hydrocyclones, mud cleaners, linear motion shakers, scroll centrifuges, vertical basket centrifuges (VBC), vacuum devices, and vortex separators. As known to those skilled in the art, these devices typically rent out at costs ranging from $1000 to $2000 per day and, as a result, can also represent a significant cost to operators. Thus, the recovery of fluids necessary to recover these costs generally requires that the recovered fluid value is greater than the equipment rental cost in order for the recovery technology to be economically justified. On excavation projects where large amounts of high-cost drilling fluid are being lost (for example in excess of 3 cubic meters per day), then daily rental charges for specialized separation equipment can provide favorable economics. In addition, an operator will likely also factor in the environmental effects and/or costs of disposal of drilling fluid contaminated drill cuttings in designing their drilling fluids/drill cutting separation/recovery systems.

Further still, past techniques for separating drilling fluid from drill cuttings have also used liquid spraying systems to deliver "washing" liquids to drill cuttings as they are processed over shaker equipment. Such washing liquids and associated fluid supply systems are used to deliver various washing fluids as the cuttings are processed over a shaker and can include a wide variety of designs to deliver different washing fluids depending on the type of drilling fluid being processed. For example, washing liquids may be comprised of oil, water, or glycol depending on the drilling fluid and drill cuttings being processed over the shaker. Generally, these washing fluids are applied to reduce the viscosity and/or surface tension of the fluids adhered to the cuttings and allow for more fluids to be recovered. However, these techniques have generally been unable to be cost effective for many drilling fluids as the use of diluting fluids often produces unacceptable increases in drilling fluid volume and/or changes in chemical consistency and, hence, rheological properties of the drilling fluid.

Thus, while various separation systems are often effective and/or efficient in achieving a certain level of fluids/cuttings separations, each form of separation technology can generally only be efficiently operated within a certain range of conditions or parameters and at particular price points. For example, standard shakers utilizing screens are relatively efficient and consistent in removing a certain amount of drilling fluid from cuttings where, during the typical operation of a shaker, an operator will generally be able to effect drilling fluid/cuttings separation to a level of 12-40% by weight of fluids relative to the drill cuttings (i.e. 12-40% of the total mass of recovered cuttings is drilling fluid). The range of fluids/cuttings wt % is generally controlled by screen size wherein an operator can effect a higher degree of fluids/cuttings separation by using a larger screen opening (eg. 50-75 mesh) and a lower degree of fluids/cuttings separation with a smaller screen opening (eg. up to 325 mesh). The trade-off between using a large mesh screen vs. a small mesh screen is the effect of mesh screen size on the quantity of solids passing through the screen. That is, while an operator may be able to lower the fluids retained on cuttings coming off the shaker with a larger mesh screen (50-75 mesh), the problem with a larger mesh screen is that substantially greater quantities of solids will pass through the screen, that then significantly affect the rheology and density of the recovered fluids and/or require the use of an additional and potentially less efficient separation technology to remove those solids from the recovered drilling fluids. Conversely, using a small mesh screen, while potentially minimizing the need for further downstream separation techniques to remove solids from recovered drilling fluids, results in substantially larger volumes of drilling fluids not being recovered, as they are more likely to pass over the screens hence leading to increased drilling fluids losses and/or require subsequent processing.

Accordingly, in many operations an operator will condition fluid recovered from a shaker to additional processing with a centrifugal force type device in order to reduce the fluid density and remove as much of the fine solids as possible before re-cycling or reclaiming the drilling fluid. However, such conditioning requires more expensive equipment such as centrifuges, scrolling centrifuges, hydrocyclones, etc., which then contribute to the overall cost of recovery. These processing techniques are also directly affected by the quality of the fluid they are processing, so fluids pre-processed by shakers using a coarse screen will not be as optimized as those received from finer screens.

Furthermore, the performance of centrifuges and hydrocyclones and other equipment are directly affected by the viscosity and density of the feed fluid. As a result, drilling fluid recovery techniques that send heavy, solids-laden fluids to secondary processing equipment require more aggressive techniques such as increased g-forces and/or vacuum to effect separation which will typically cause degradation in the drill cuttings.

Further still, such secondary processing equipment typically cannot process drill cuttings and drilling fluids at the same throughput values of a shaker with the result being that additional separation equipment may be required or storage tanks may be required to temporarily hold accumulated drilling fluid.

Thus, the operator will try to balance the cost of drilling fluid losses with the quality of the fluid that is recovered together with other considerations. While operators will typically have little choice in the quality of the cuttings processing and fluid recovery techniques available, many operators will operate separation equipment such that the recovered drilling fluid density from the separation equipment will be about 200-300 kg/m$^3$ heavier than the density of the circulating fluid in the system. This heavier fluid which would contain significant quantities of fine solids and that when left in the drilling fluid will either immediately or over time impair the performance of the drilling fluid or any other type of fluid.

As a result, there continues to be a need for systems that economically increase the volume of fluids recovered from a shaker without negatively impacting the rheological properties of the recovered drilling fluid. More specifically, there has been a need for separation systems that result in recovered fluid densities in the range of 5-100 kg/m$^3$ relative to the original fluid density and that do not affect rheological properties such as plastic viscosity and gel strength.

In addition, there has been a need to develop low-cost retrofit technologies that can enhance fluid recovery and do so at a fractional cost level to mechanisms and technologies currently employed. Further, there has been a need for retrofit technologies that can be utilized on a variety of shakers from different manufactures and that can be used to enhance the operation of existing shakers.

Further still, there has been a need to develop separation technologies that enhance the operation of secondary separation equipment.

The use of vacuum technology has been one solution to improving the separation of drilling fluids. However, vacuum technology in itself presents various problems including insufficient cuttings/fluids separation that, as noted above, requires additional and expensive downstream processing, and its inability to effectively remove fines from the recovered drilling fluid which contributes to an increase in the density of the recovered drilling fluid. Moreover, aggressive vacuum systems will also degrade cuttings such that the problem of creating fines is increased.

In addition, various vacuum technologies may also present dust and mist problems in the workplace as, with past vacuum techniques, there is a need to regularly clean clogged screens with high pressure washes. High pressure washing of screens creates airborne dust and mist hazards to operators. Thus, there continues to be a need for technologies that minimize the requirement for screen washing.

Further still, there has been a need for improved fluid separation systems on the underside of a vacuum screen that allows relatively large volumes of air to be drawn through a vacuum screen to be effectively and efficiently separated from the relatively low volume of drilling fluid being drawn through a vacuum screen. That is, there has been a need for improved fluid/air separation systems. There has also been a need for vacuum technologies that assist in the oxidation of fatty acids within a drilling fluid that may reduce the need for additional emulsifiers.

Operationally, there has also been a need for improved methods of operating a vacuum system that effectively minimizes the risk of screen clogging but that also enables the use of finer screens.

Further still, there has been a need for systems that allow for the efficient replacement of screens but that also provide improved gaskets and sealing between the vacuum system and the screens.

Further still, there has been a need for retrofit systems that can be adapted to standard shakers without substantial modification to the existing shaking and that allow for quick and easy installation at a job site. In addition, there has been a need for retrofit systems that also allow for ready disassembly of the system for transport and/or maintenance.

Further still there has been a need for systems that provide improvements in the overall solids control program of a drilling program that allows greater flexibility in the management of the solids control equipment such that less fluid is delivered to the secondary processing equipment and wherein more expensive drilling fluids can be more efficiently and effectively recovered.

As is known, the entry of gas from a formation into circulating drill fluid occurs regularly during drilling operations where pressurized gasses from the formation mix with the circulating drilling fluid and dissolve within the drilling fluid which depending on the quantity and pressures may fully saturate the drilling fluid. This is particularly true as a drill bit enters a pay-zone within the formation and there is an influx of formation gas into the well bore which will lead to a saturation of drilling fluid with the formation gas. As the drilling fluid rises to the surface and is depressurized, gas may be released from the drilling fluid.

At surface, one of the first indicators of a "kick" or uncontrolled entry of gas into the circulating system is the appearance of a foamed drilling fluid at the shaker as gas bubbles form within the viscous drilling fluid. A foamed drilling fluid will typically result in a loss of drilling fluid over the shaker as the gas bubbles may not collapse over the shaker and/or minimize the contact of drill cuttings with the shaker screen thereby reducing the normal effectiveness of the shaker in a given time. In other words, the g-forces of the shaker may delay or be insufficient to immediately overcome the surface tension of the gas bubbles.

This problem is often addressed by increasing the screen size (i.e. a coarser screen), however, this action as noted above will result in lower quality drilling fluid being recovered. Alternatively, this problem is often addressed by by-passing the shaker to other gas separation equipment that may lead to drilling fluid degradation.

As a result, there has also been a need for systems that improve the ability of shaker systems to improve gas/fluid separation at a shaker as well as being able to provide effective information to operators about the location of a drill-bit relative to a pay-zone.

A review of the prior art reveals that various technologies including vacuum technologies have been used in the past for separating drilling fluids from drill cuttings including vibratory shakers.

For example, U.S. Pat. No. 4,350,591 describes a drilling mud cleaning apparatus having an inclined travelling belt screen and degassing apparatus including a hood and blower. U.S. Patent Publication No. 2008/0078700 discloses a self-cleaning vibratory shaker having retro-fit spray nozzles for cleaning the screens. Canadian Patent Application No. 2,664,173 describes a shaker with a pressure differential system that applies a non-continuous pressure across the screen and other prior art including U.S. Pat. No. 6,092,390, U.S. Pat. No. 6,170,580, U.S. Patent Publication 2006/01 13220 and PCT Publication No. 2005/054623 describe various separation technologies.

Thus, while past technologies may be effective to a certain degree in enabling drilling fluid/cuttings separation, the prior art is silent in aspects of the design and operation of separation devices that enable fluid removal to substantially improved levels. Specifically, the prior art is silent with respect to achieving fluids retained on cuttings level below about 12% by weight and that does not have an adverse effect on the density of recovered drilling fluid.

Examples of past systems and methods used to detect gas presence in wells include those systems and methods disclosed in United States Patent Publication 2006/0254421, U.S. Pat. No. 6,389,878, U.S. Pat. No. 4,635,735, U.S. Pat. No. 4,492,862 and U.S. Pat. No. 4,298,572.

SUMMARY OF THE INVENTION

In accordance with the invention, there is provided improved shaker systems and methods for the separation of drilling fluid and drill cuttings, the degassing of drilling fluids and improved drilling fluids solids handling.

In a first embodiment, a system for improving the separation of drilling fluid from drill cuttings on a shaker is provided, the shaker having a shaker screen and support system for supporting drilling fluid contaminated drill cuttings within a shaker; the apparatus including: a first fluid collection system for operative positioning beneath the shaker screen and support system to collect drilling fluid from a first section of the shaker screen and support system; and, a second fluid collection system for operative positioning beneath the shaker screen and support system to collect drilling fluid from a second section of the shaker screen and support system.

In one embodiment, the drilling fluid is collected from each of the first and second fluid collection systems and is processed independently of each another.

In another embodiment, the second fluid collection system includes a screen extension and screen for retro-fit connection to the shaker screen and support system, the screen extension and screen extending beyond an original length of the shaker screen and support system; and, a retro-fit drilling fluid collection system operatively connected to the screen extension for collecting fluid from the screen extension screen.

In another embodiment, separate screens having different screen mesh sizes are operatively positioned above each of the first and second fluid collection systems.

In one embodiment, at least one of the first and second fluid collection systems includes a hopper.

In another embodiment, the system also includes at least a third fluid collection system for operative positioning beneath the shaker screen and support system to collect drilling fluid from a third section of the shaker screen and support system and wherein separate screens having different screen mesh sizes are operatively positioned above each of the first and second and at least the third fluid collection systems.

In other embodiments, at least one section of the fluid collection system includes a vacuum system; the first and second fluid collection systems are separated by a walled-partition; and/or the walled-partitions are adjustable allowing an operator to adjust the relative size of each of the first and second fluid collection systems.

In another embodiment, the system may also include a mist collection system operatively positioned above the shaker screen and support system to collect drilling fluid mist liberated from the operation of the shaker. The mist collection system may include a dessicant.

In another embodiment, the system includes a primary separation tank operatively connected to the first fluid collection system wherein drilling fluid collected from the first fluid collection system is delivered to the primary separation tank and a secondary separation tank operatively connected to the second fluid collection system wherein drilling fluid collected from the second fluid collection system is delivered to the secondary separation tank.

In another embodiment, each of the first and second sections of the shaker screen and support system operatively support screens of different sizes with a screen having a smaller screen size located within an upstream section of the shaker screen and support system.

In other embodiments, drilling fluid from the secondary separation tank is delivered to a secondary separation system for removal of solids, delivered to the primary separation system and then re-used for drilling.

In another embodiment, a portion of a downstream section of the shaker screen and support system includes a vacuum system operatively connected to the shaker screen and support system and the secondary separation tank, the vacuum system for subjecting a section of the shaker bed to a vacuum pressure. In a preferred embodiment, the vacuum system includes a bleed valve adjacent the shaker screen and support system for introducing a volume of air into the vacuum system for inducing turbulence in the vacuum system to enhance gas/liquid separation. The vacuum system may also include a gas/liquid separator having a gas sensor for detecting the concentration of formation gas within the drilling fluid.

In one embodiment, the vacuum system includes a vacuum manifold for operative connection to a screen and a vacuum bleed adjacent or part of the vacuum manifold for adjusting the vacuum within the manifold.

In one embodiment, the screen extension and screen retro-fit to the shaker screen and support system includes a manifold for operative connection to a fluid collection system.

In one embodiment, the hopper is connected to the shaker screen and support system and shakes with the shaker screen and support system during operation of the shaker.

In another aspect, the invention provides a method of separating drill cuttings from drilling fluids on a shaker having a shaker screen comprising the steps of: subjecting drilling fluid and drill cuttings on first and second sections of a shaker screen to screen separation; and, collecting drilling fluid from the first and second sections into first and second fluid collection systems respectively. The first and sections may have different screen sizes.

The method may also comprise the further steps of subjecting drilling fluid from the second fluid collection system to secondary separation to remove solids; subjecting a portion of drilling fluid from the second section to vacuum separation through the shaker screen by a vacuum system; and/or controlling air flow through the shaker screen to improve emulsion stability of drilling fluid recovered from the vacuum system.

In another embodiment, the vacuum system includes a gas/liquid separator and a gas sensor and the method further comprises the step of monitoring the concentration of formation gas recovered from the drilling fluid.

In another aspect, the invention provides a modular extension system (MEU) for operative connection to a downstream end of a shaker including: a body configured for operative connection to a shaker bed on the shaker, the body supporting a screen and a fluid collection system operatively connected to the screen.

In another embodiment, the body includes: an open funnel-shaped manifold for draining drilling fluid towards a vacuum-manifold opening wherein the vacuum-manifold opening includes a vacuum connection system for connection to a vacuum system.

In another embodiment, the MEU includes a front member, back member and side gussets operatively connected to the funnel-shaped manifold wherein the front member, back member and side gussets operatively support a screen and screen-support system.

In yet another embodiment, the side gussets include brackets for operative connection of the side gussets to a shaker frame.

BRIEF DESCRIPTION OF THE DRAWINGS

The invention is described with reference to the accompanying figures in which:

FIG. 6F is a plan view of the separated fluid collection system in accordance with one embodiment of the invention;

DETAILED DESCRIPTION OF THE INVENTION

With reference to the figures, embodiments of improved drill cuttings/drilling fluid separation systems are described.

Shaker Screen with Extension

In various embodiments, as shown in FIGS. 1-3 and FIGS. 3A-3H, a shaker 10 having an extended screen 11 and modular extension units (MEU) 12a are described. In particular, the MEU embodiments allow the shakers of various manufacturers to be retro-fit with a longer screen bed for various functional reasons including the incorporation of a vacuum manifold 12 or dual or separated fluid collection system as will be explained in greater detail below.

In particular, in some shaker designs, it is technically challenging to attach a vacuum manifold system 12 as described in Applicant's co-pending applications to the shaker when the volume or space beneath the shaker bed cannot readily accommodate a vacuum manifold. Moreover, in some designs, the addition of vacuum hoses beneath the shaker bed can result in premature wearing and/or failure of the vacuum hoses due to the potential for impact/abrasion with various shaker structures.

Figure 1:
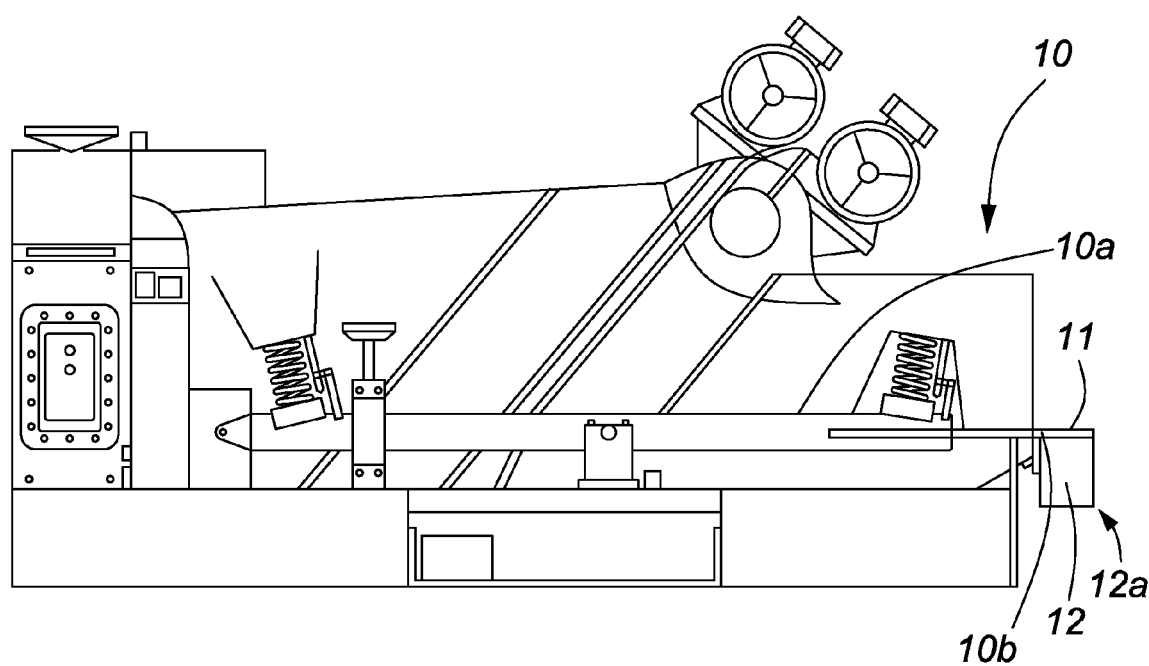
FIG. 1 is a side view of a shaker retro-fit with an extended screen and vacuum manifold in accordance with one embodiment of the invention.

As shown in FIGS. 1-3 and FIGS. 3A-3H, a shaker extension in the form of a MEU 12a can be incorporated to form a larger shaker bed such that an additional screen can be configured to the shaker bed that extends beyond the regular end of the shaker. As shown in FIG. 1, the MEU also enables a vacuum manifold 12 to be configured to the extended portion of the shaker bed and screen in a manner described in Applicant's co-pending applications and as described herein.

In the un-extended portion of the shaker bed, fluid will pass through the screen 10a and be collected by the normal fluid collection system of the shaker (typically a pan having a drain port). In the extended portion of the screen 11, fluid is collected separately such as by a vacuum manifold 12 configured to an MEU 12a.

As a result, by virtue of the extension, the vacuum manifold 12, vacuum hose 16 and other vacuum equipment can be readily routed around the exterior of the shaker which can provide a number of advantages over previous systems. For example, an MEU can result in substantially lower installation costs for shakers built by particular manufacturers as the time and/or labor costs for retro-fitting can be substantially reduced as compared to retrofitting a vacuum manifold system within the main shaker structure. In addition, an MEU may also simplify configuration in a situation where a single vacuum pump is configured to more than one vacuum manifold on different shakers as connection piping may be simplified. Further still, should the vacuum recovery lines become clogged during operations, as the MEU is external to the shaker, it is usually unnecessary to shut the shaker down (and hence affect drilling operations) as access to the plugged lines can still be realized while the shaker is operating.

Figure 2:
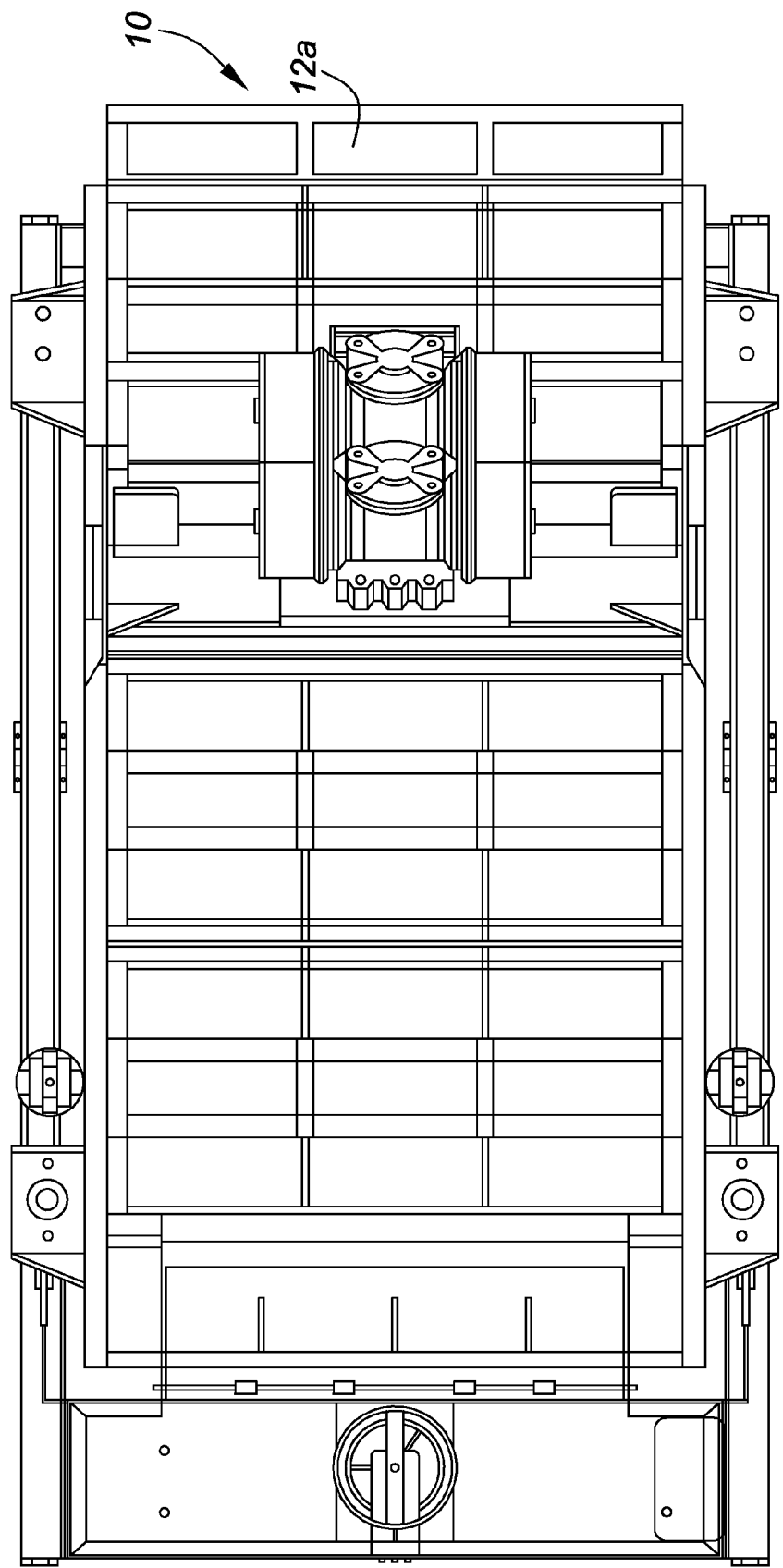
FIG. 2 is a plan view of a shaker retro-fit with an extended screen and vacuum manifold in accordance with one embodiment of the invention.
Figure 3:
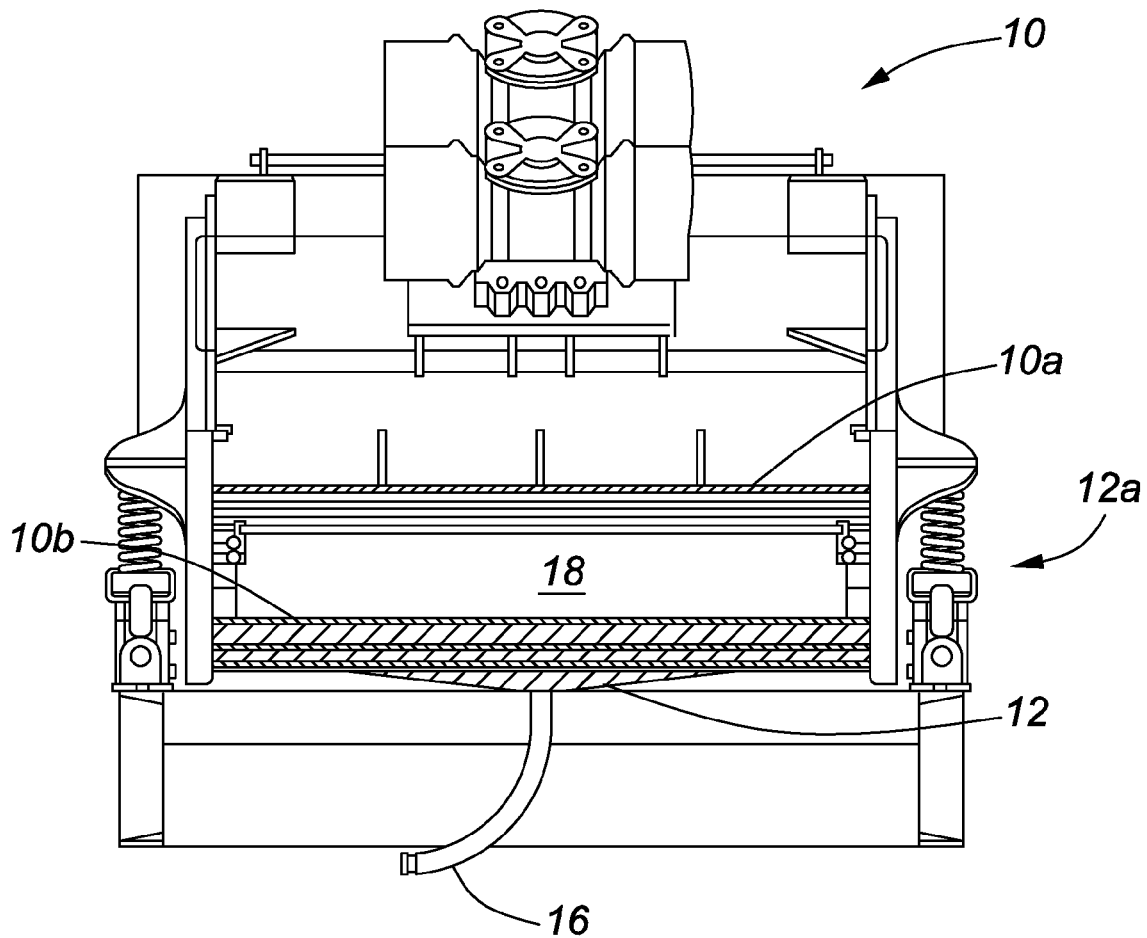
FIG. 3 is an end view of a shaker retro-fit with an extended screen and vacuum manifold in accordance with one embodiment of the invention.

FIG. 2 shows a top view of a shaker 10 with an MEU 12a with an extended screen bed and FIG. 3 shows an end view of a shaker with an MEU and an extended screen bed. As best shown in FIG. 3, the MEU includes a vacuum manifold 12 and vacuum hose 16 attached. It should also be noted that FIG. 1 shows an embodiment of a form of shaker in which the shaker bed is stepped between an upper portion 10a and lower portion 10b.

Generally, the screen bed can be extended by welding or bolting on extensions to the vibrating tray such as the modular extension unit (MEU) 12a. In this case, the MEU includes various flanges, gussets and/or brackets that allow the connection of the MEU 12 to the shaker bed.

Figure 3A:
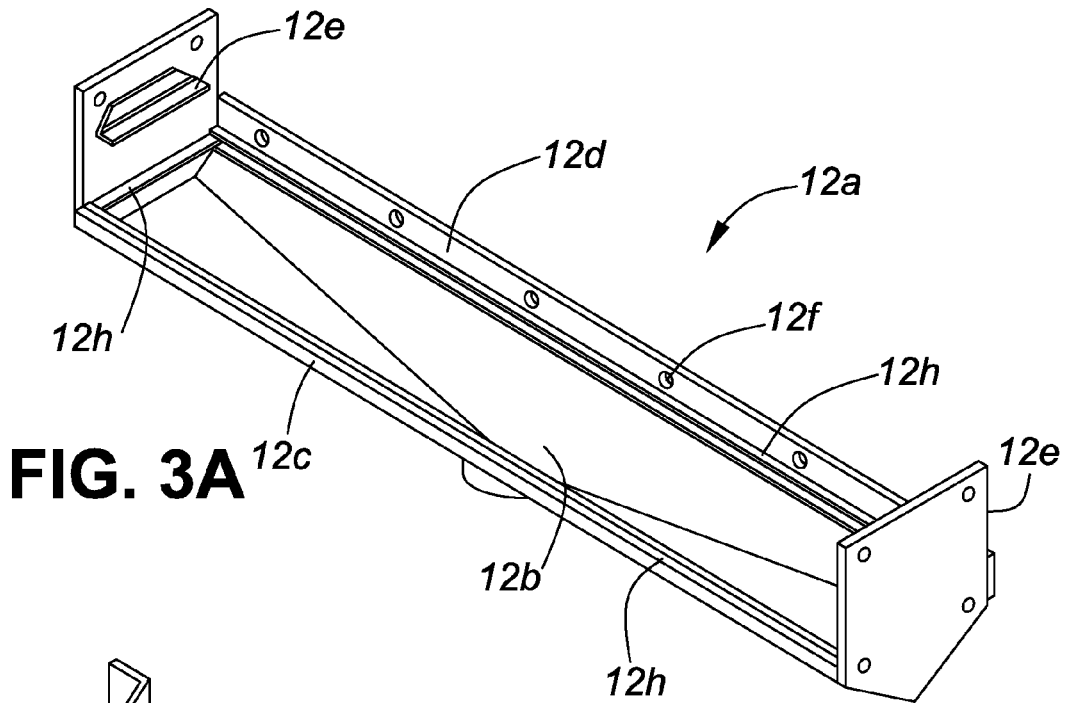
FIGS. 3A-3H are isometric views of representative modular extension units (MEU) for configuration to different shakers.
Figure 3B:
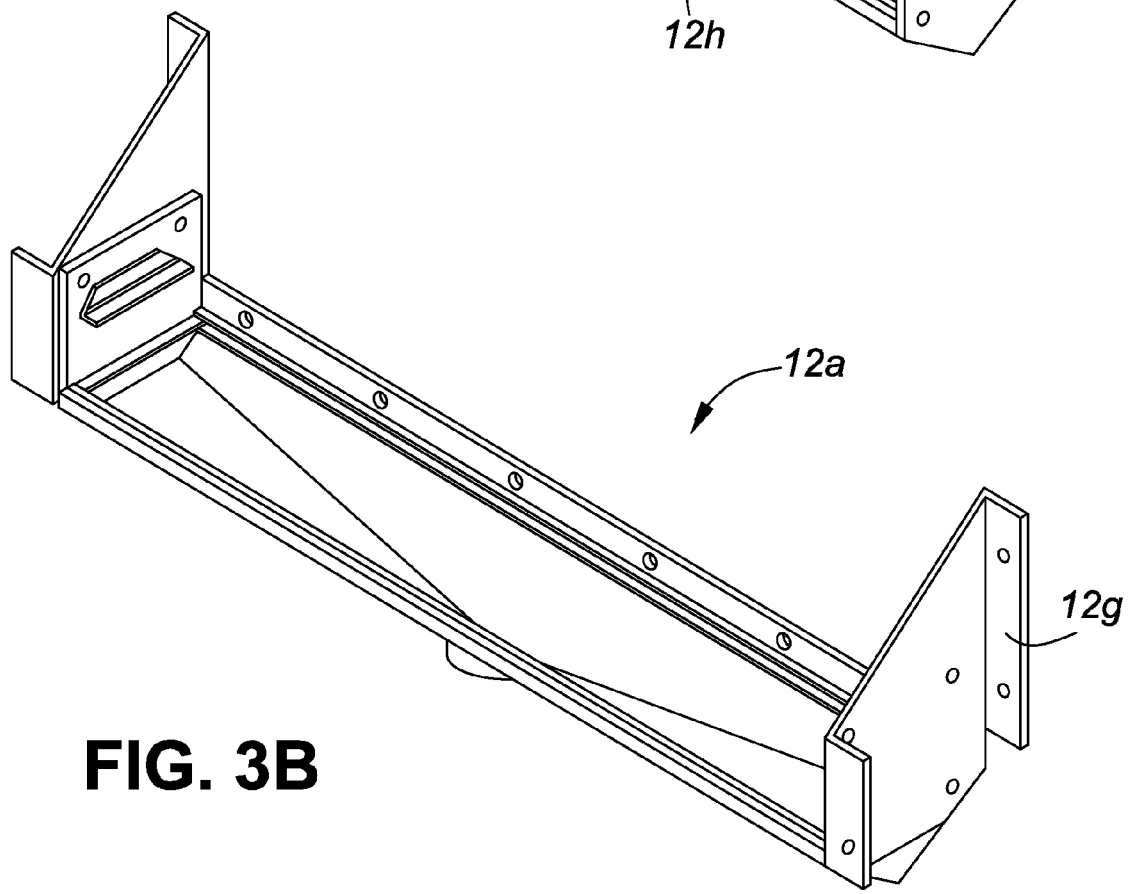

As shown in FIG. 3A, an MEU is shown having a single screen manifold 12b defining the bottom of the MEU for connection to a vacuum hose. The MEU includes a front member 12c, back member 12d and side gussets 12e forming the ends of the MEU. The back member and side gussets include appropriate bolt holes 12f for connection of the MEU to a specific shaker and/or connection of further brackets. For example, as shown in FIG. 3B, the MEU may include additional brackets 12g with appropriate holes allowing connection to a specific shaker. As shown in FIG. 3A, each of back member, side gussets and front member include an appropriate rail 12h for operative support of a screen frame.

Figure 3C:
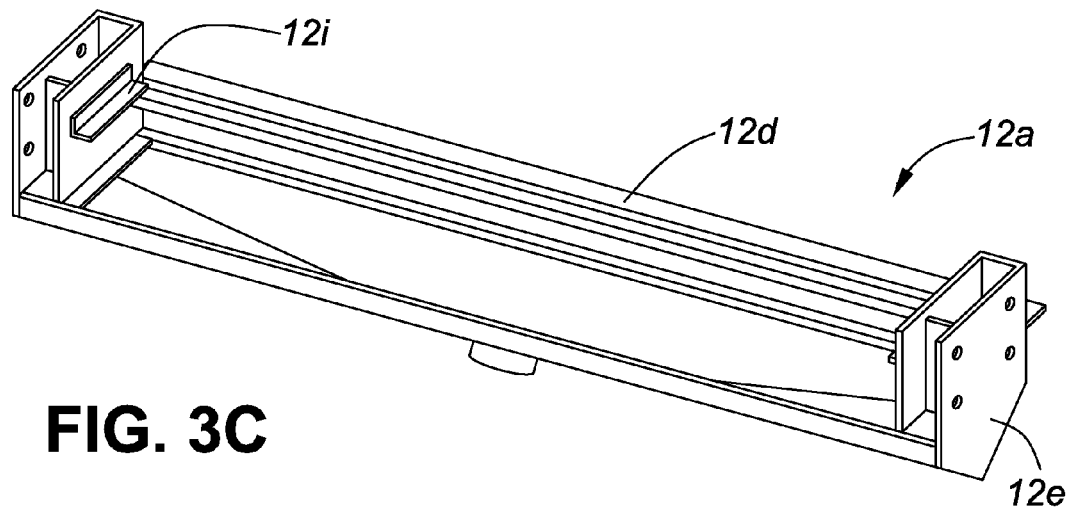
Figure 3D:
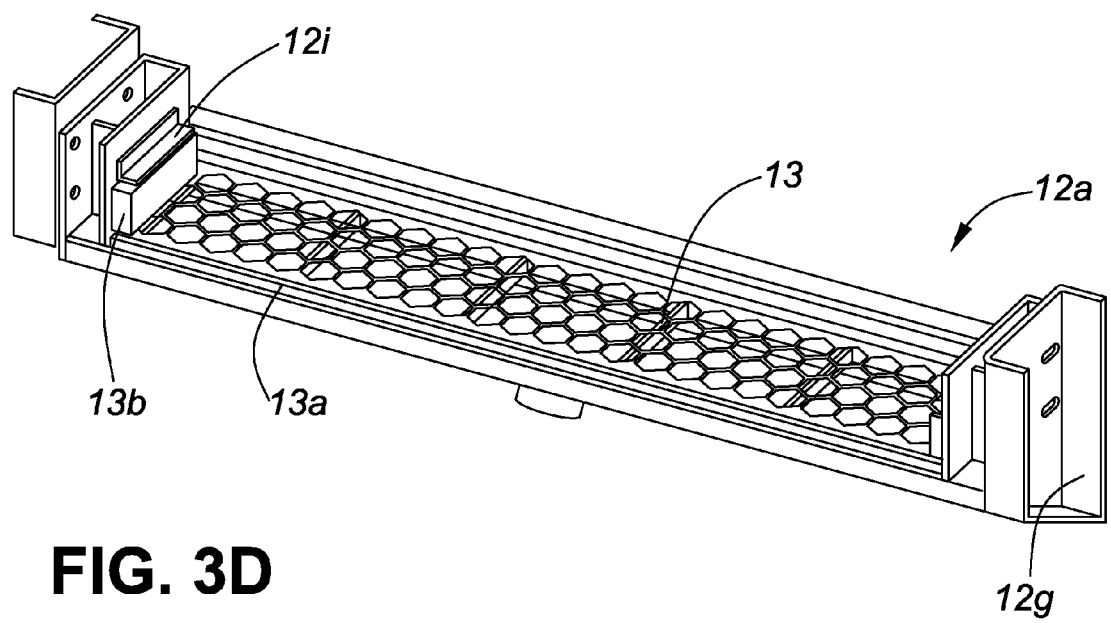
Figure 3E:
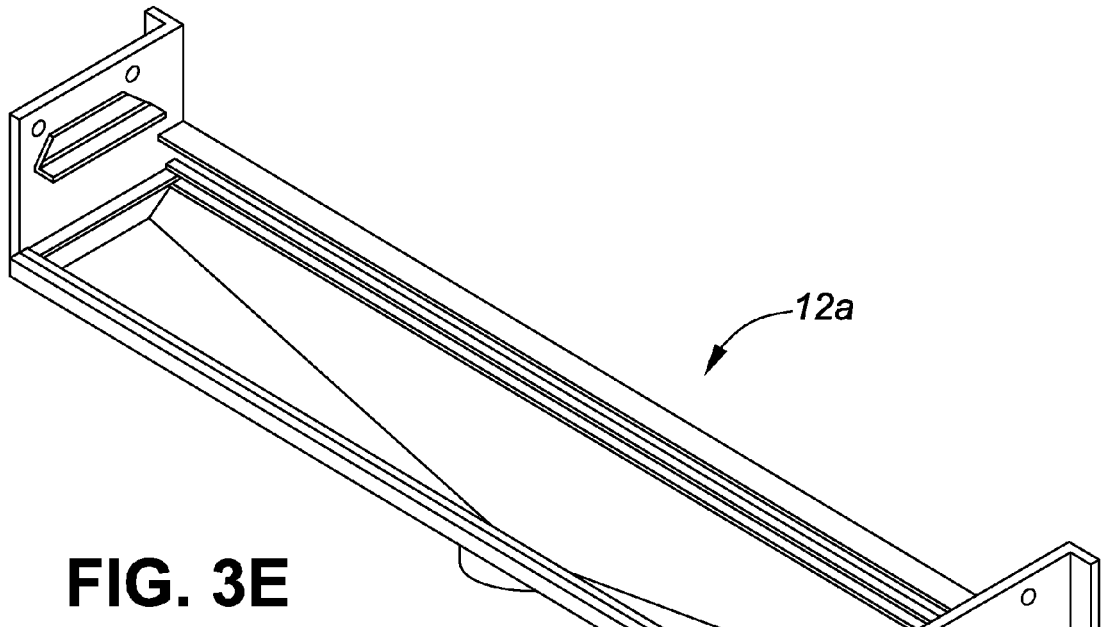
Figure 3F:
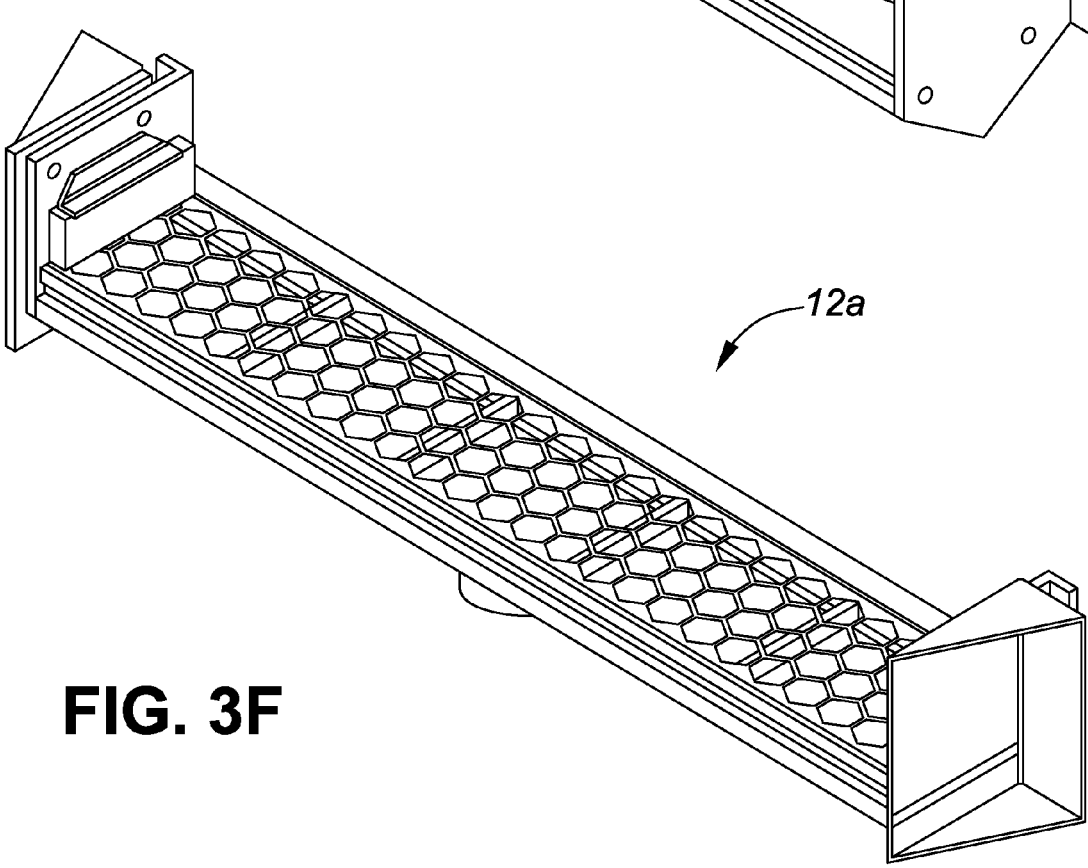
Figure 3G:
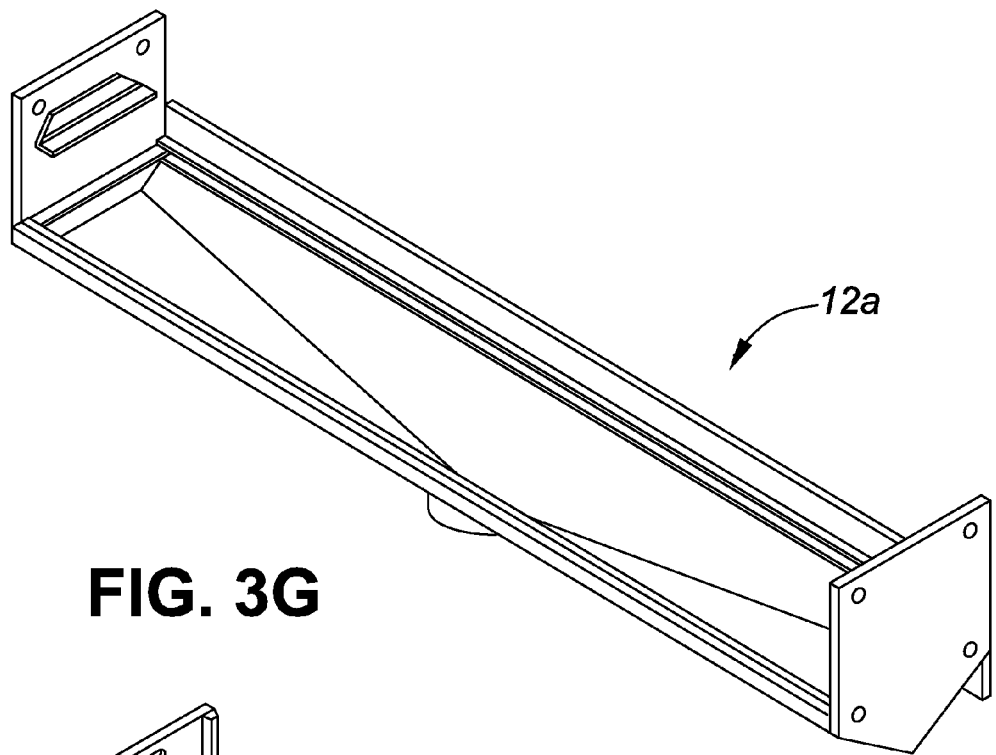
Figure 3H:
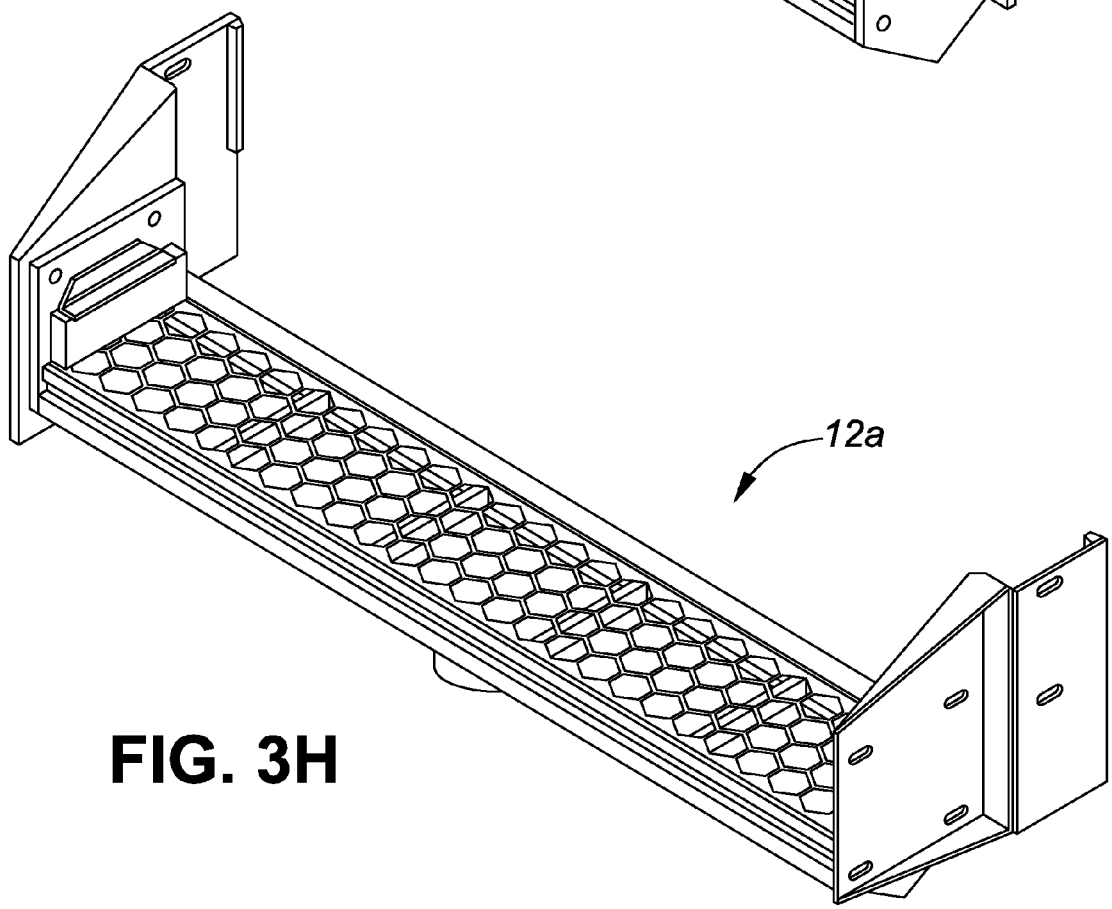

FIGS. 3C and 3D show a further embodiment in which an MEU has different side gussets 12e, brackets 12g and rear member 12d for connection to a different shaker. As shown in FIG. 3D, a screen bed 13 is shown secured to the MEU. In this example, the screen bed includes its own frame 13a with side blocks 13b allowing the screen frame 13a to be placed on the MEU wherein the side blocks 13b secure the screen frame within a slot defined by angle brackets 12i and the MEU.

FIGS. 3E-3H show further examples of side gussets and brackets.

Importantly, the MEU can be operated with or without vacuum. In other words, the MEU can be provided to lengthen the shaker bed, allow the ready configuration of a screen of a different size and/or allow the incorporation of a vacuum system.

Different Mesh Screens in Different Sections

Figure 6:
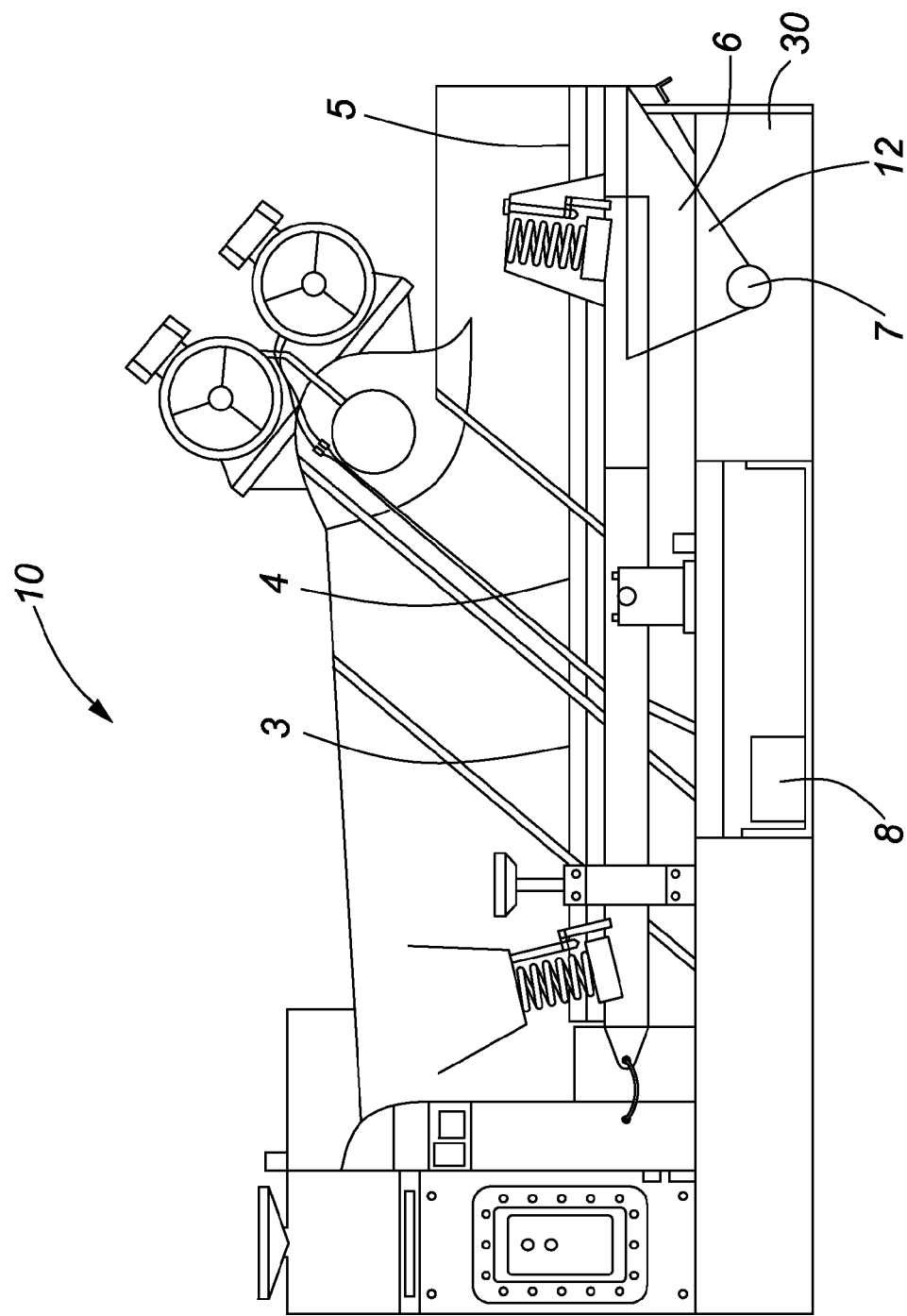
FIG. 6 is a side view of a shaker retro-fit with a segmented panel shaker screen and three screens and a dual fluid collection system in accordance with one embodiment of the invention.

In another embodiment as shown in FIGS. 6-6F, a shaker system incorporating different size mesh screens at positions 3, 4, and 5 is provided. In these embodiments, an operator may wish to utilize a coarser screen at position 5 on the downstream vacuum section of the shaker and finer screens at positions 3, 4 on the upstream section(s) of the shaker. For example, while it is generally desired to run as fine a screen as possible to prevent the passage of smaller particles through the screen that may have a detrimental effect on the performance of the drilling fluid, very fine screens may result in substantial fluid flow over the shaker thereby resulting in poor drilling fluid/drill cuttings separation and hence drilling fluid recovery, even with a vacuum system present. As such, and in accordance with the invention, a coarser screen may be utilized in the downstream portion of the shaker so as to improve the overall drilling fluid/drill cutting separation. While the use of mesh screens of different sizes may result in an increase in larger particles passing through the screen at the downstream section of the screen, separate fluid collection systems for the upstream 8 and downstream 6 sections can ensure that the fluid recovered from the upstream sections is substantially devoid of larger solid particles. As a result, the fluid recovered from the downstream section 6, while potentially containing a larger fraction of solid particles, the recovered fluid from the downstream sections can be separately subjected to secondary separation techniques. As the secondary separation techniques will generally be performed on a smaller quantity of recovered drilling fluid, such techniques can operate more efficiently than when such secondary separation techniques are applied to a larger volume of recovered drilling fluid.

By way of example, under typical drilling operations, a drilling rig will typically circulate fluid at 2 m³/min and may have two shakers and one centrifuge as part of the solids separation equipment. The centrifuge may have an optimum processing rate of 0.3 m³/min which means that 1.7 m³/min of drilling fluid cannot be processed at the same rate that fluid is being circulated. Further in order to prevent the loss of drilling fluid at the shaker, it may be a requirement that the operator be limited to using API 170 mesh screens which have a cut point of >82 microns. This would mean that 1.7 m³/min of fluid containing solids less then 82 microns are being recirculated down the well where they will be reduced in size by the erosive conditions of pumping, shearing at the bit, and being smashed into the rock face at the bit. Under these conditions, the eventual result is a build up of fine materials in the drilling fluid system; with a corresponding high surface area and high charge density resulting in a heavier fluid then may be desired, viscosity increases which may not be desired, and the increased addition/concentration of chemicals used to ameliorate these effects.

To address these issues, a shaker and fluids separation system incorporating partitions into the shaker is described by way of example. In this example, a finer screen (eg. API 325 mesh screen) is located in the upstream positions of the shaker. During normal operation, these screens can effectively process approximately 1.7 m³/min of fluid through the screens and thereby separate particles greater then 41.5 microns. A coarse screen is incorporated on the downstream position of the shaker (eg. API 140 mesh) to allow the remaining 0.3 m³/min to pass through the screen and prevent fluid from flowing off the end of the shaker. Thus, this screen would allow the passage of all particles less than 98 microns through the screen. The partitions therefore allow for the separate collection of the fluid from the different shaker sections.

Fluid from the coarse section, which is a relatively small proportion of the total volume of fluid passing over the shaker, is then processed by a centrifuge to remove solids down to as low as 2 microns.

As a result, the subject system and method significantly delays the build up of solids in the re-circulated drilling fluid by more effectively isolating the coarse solids and removing them before they re-enter the circulating system and be degraded.

Further the incorporation of a vacuum system across a section or a part of a coarse screen section, with or without the partition acts in much the same way, and allows the operator to run finer screens without losing fluid off the end of the shaker. However, as a vacuum system may not be applied across a larger section of the shaker bed, the volume of processing i.e. 0.3 m³/min that partitioning can typically provide is generally more than the typical 0.1-0.2 m³/hr that vacuum processing per se provides.

Importantly, the above system and methodologies may be effective in forestalling fines generation in the system. That is, as it is understood that very fine solids are not generated to a significant degree by bit actions on rock face, the result of solids separation by an aggressive first cut by the shaker in the partitioning/vacuum format may effectively forestall fines generation.

Figure 4:
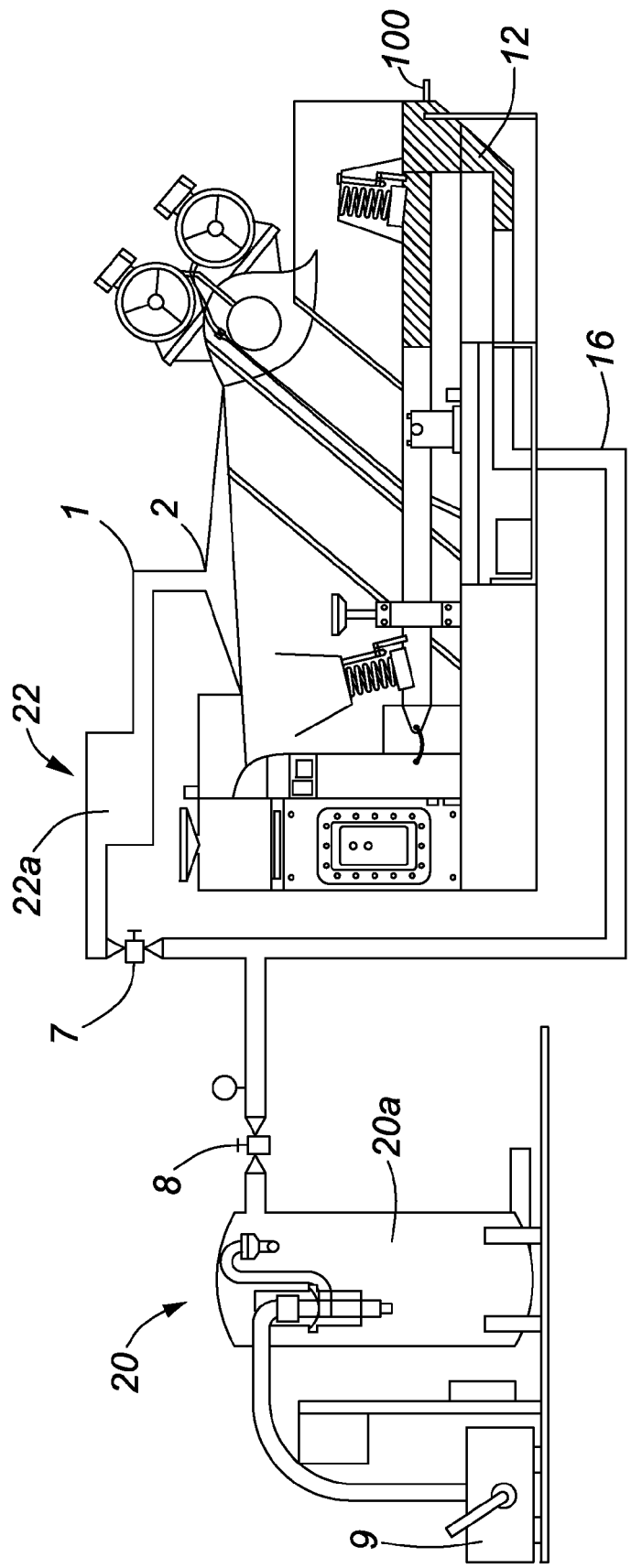
FIG. 4 is a side view of a shaker retro-fit with a mist collection system and de-humidification system in accordance with one embodiment of the invention.
Figure 5:
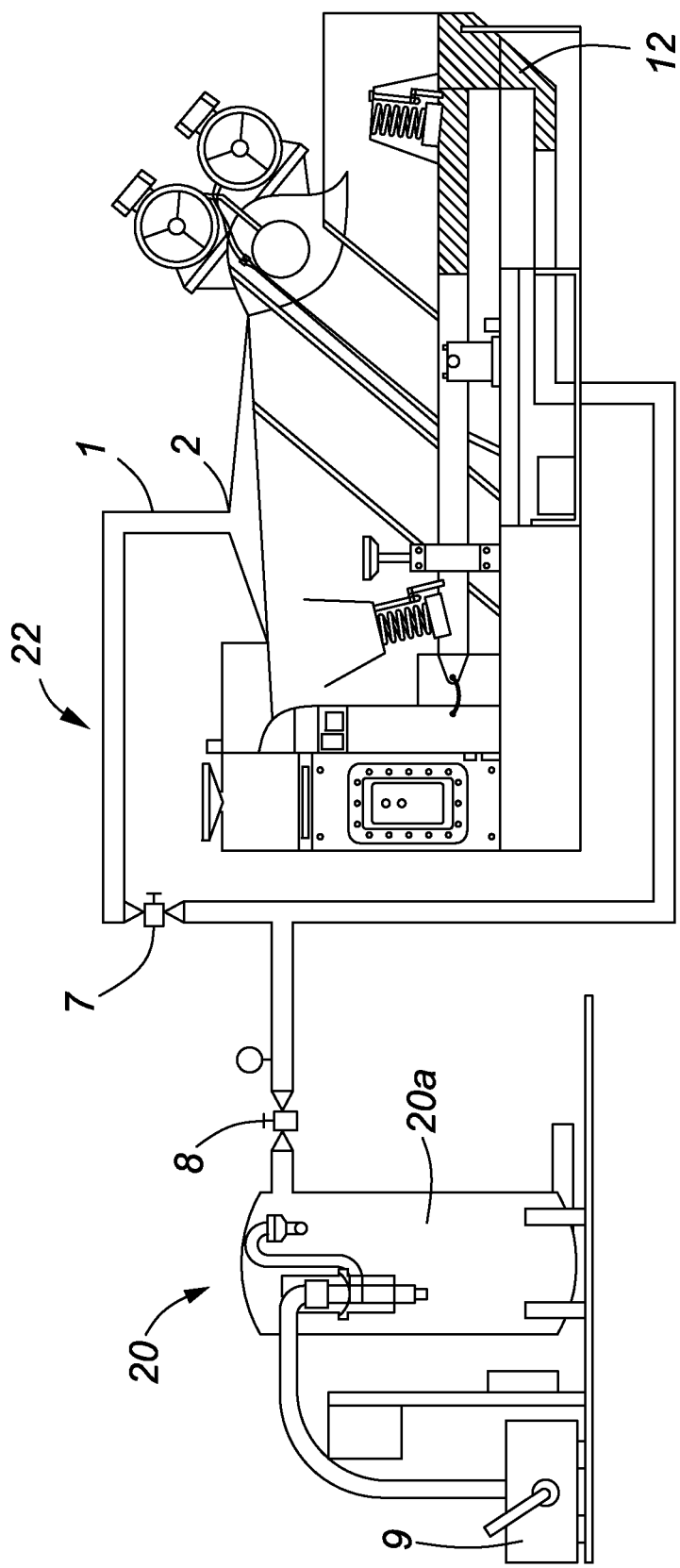
FIG. 5 is a side view of a shaker retro-fit with a segmented panel shaker screen and three screens, a mist collection system and a vacuum manifold in accordance with one embodiment of the invention.

In another embodiment, as shown in FIGS. 4 and 5, a vacuum pump system 20 configured to apply a vacuum pressure to a vacuum manifold 12 may also include a mist collection system 22 for capturing drilling fluid mist that may be liberated from the shaking action of drilling fluid and cuttings on the screens. The mist collection system 22 will generally include a hood 2 configured above the shaker together with appropriate piping 1, pressure control valves 7,8 and vacuum pump 9. As shown in FIG. 4, the mist collection system may also include a dehydration system 22a containing a desiccant for stripping water from the recovered mist.

As noted above, FIGS. 6 and 6A-6F show embodiments utilizing a secondary fluid collection system. The secondary fluid collection system may be, for example, in the form of one or more hoppers 6, 6a (FIGS. 6, 6E, 6F), one or more partitions (FIGS. 6B, 6C, 6D) or a combination of hoppers and partitions and a MEU (FIG. 6A) configured with separate piping systems.

In the hopper system, one or more hoppers are configured to collect fluid from a specific region of the shaker wherein fluid passing through the screen from that region will fall into the hopper for collection. The hoppers 6, 6a may be connected directly to the shaker bed such that they move with the shaker bed or may be connected to the shaker separate from the shaker bed such that they do not move with the shaker bed. Importantly, in the case where hoppers are configured to the shaker, the shaking hoppers may have a shear-thinning effect on drill fluid contacting the hoppers such that the flow of drill fluid away from the shaker bed is enhanced due to the shear induced reduction in viscosity and the momentum imparted to the fluid by the shaking. As discussed in greater detail below, this can improve the overall fluid and solids handling within the system.

In the partition system, one or partitions 28 are configured to brackets 29 within the shaker pan 30 so as to create separate containment regions within the shaker pan. Normally, each partition would be located at the transition point between screens of different sizes. Moreover, in a further embodiment, the partitions may be re-positioned within different brackets 29 such that the operator can quickly adjust the position of the partitions in the event that the screen sizes are adjusted during operation as shown in FIGS. 6B-6D.

Figure 6A:
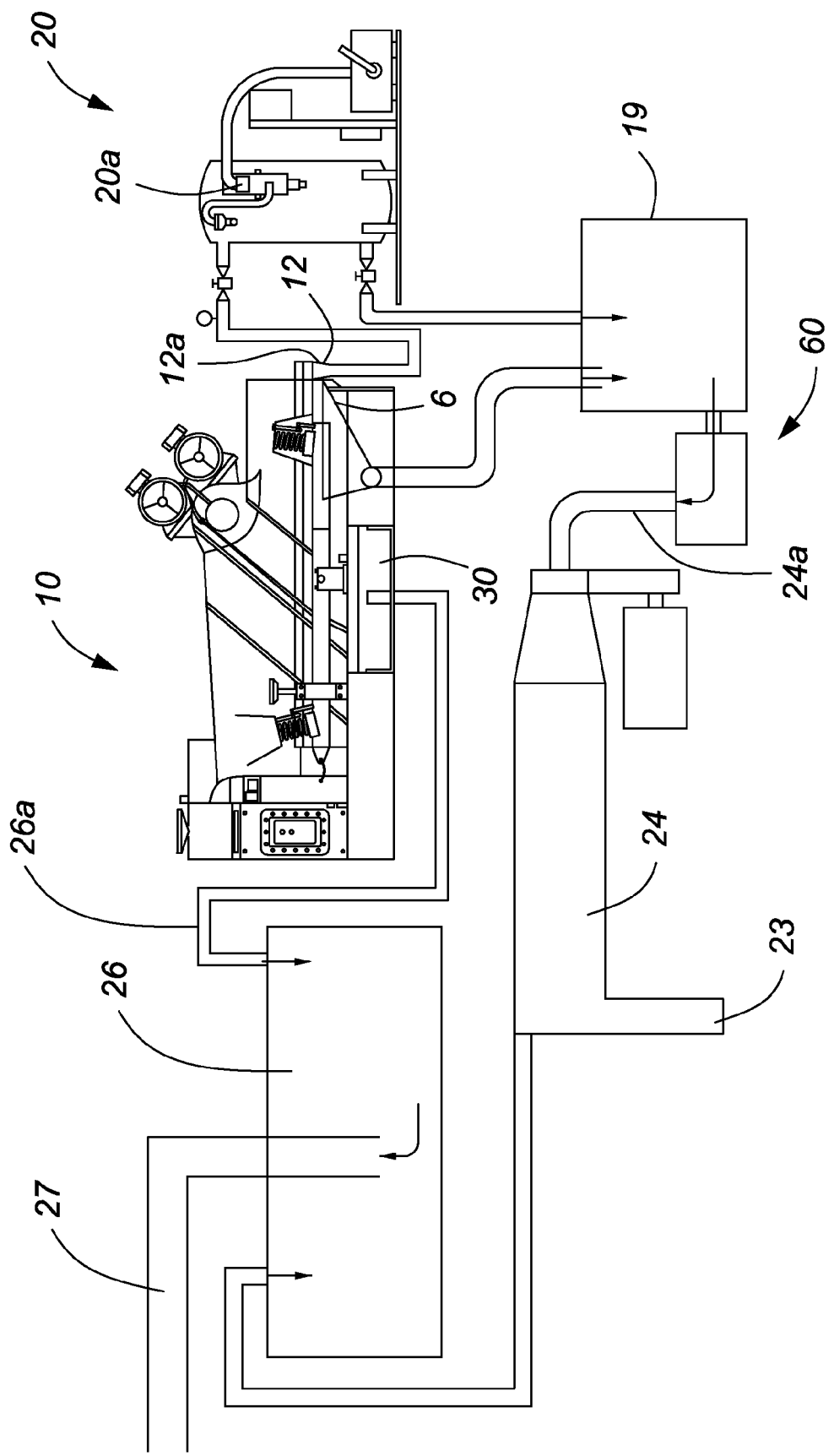
FIG. 6A is a schematic diagram of a drilling fluid/cuttings separation system in accordance with one embodiment of the invention.
Figure 6B:
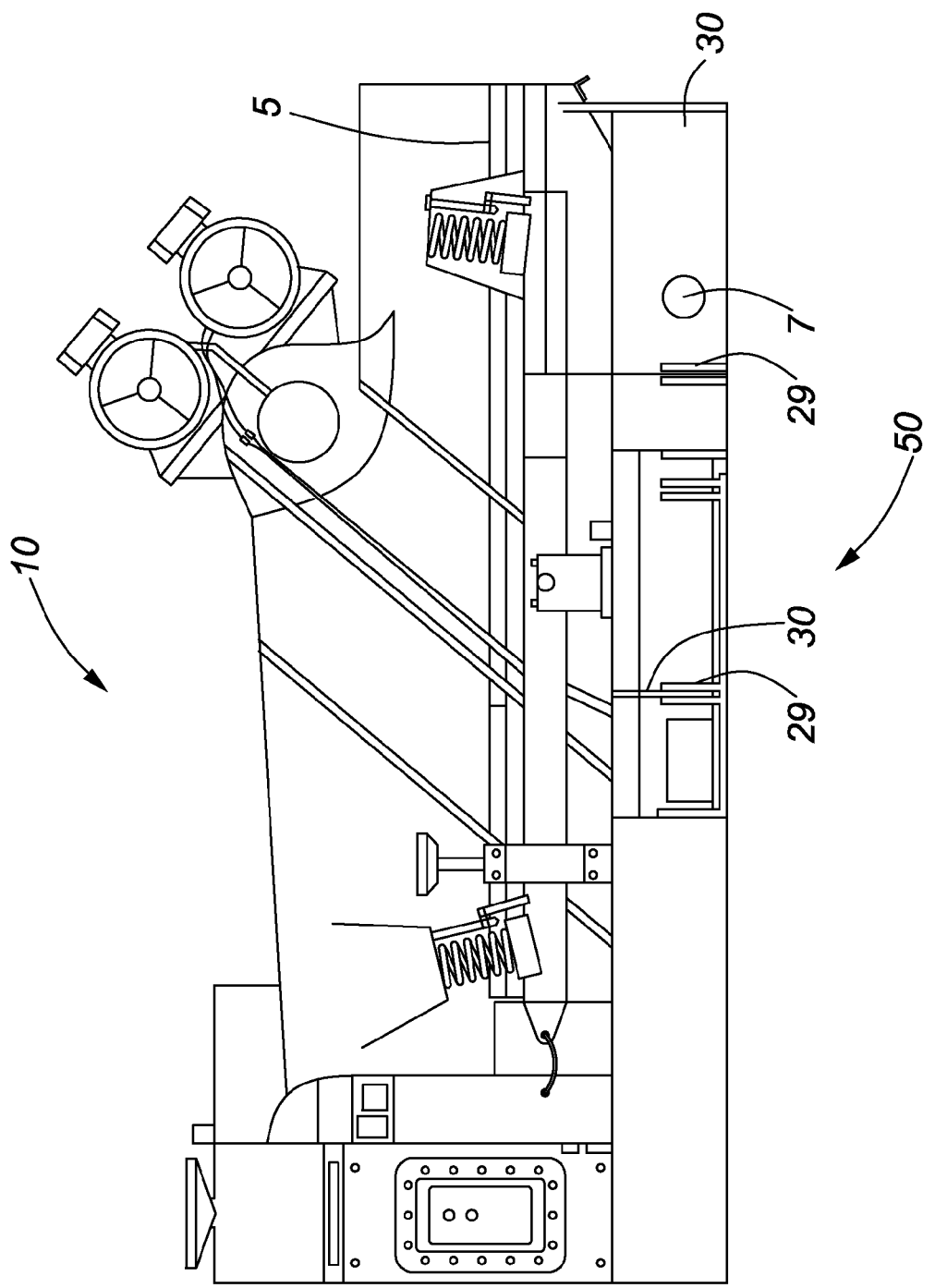
FIG. 6B is a side view of a shaker retro-fit with a partitioned pan in accordance with one embodiment of the invention.
Figure 6C:
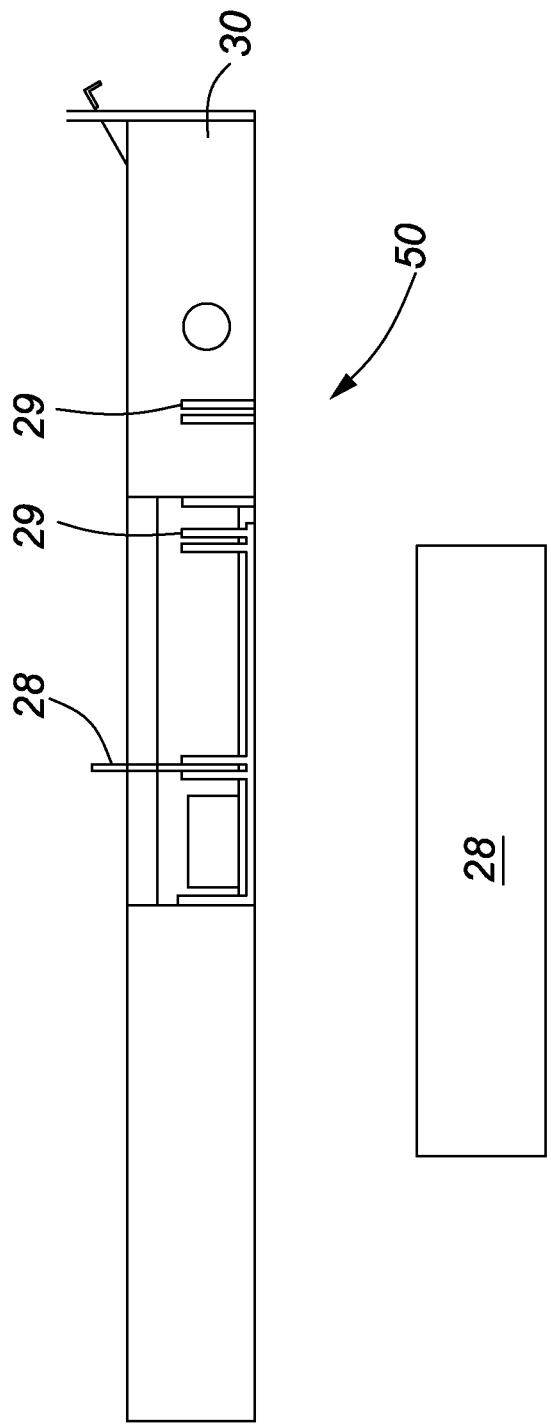
FIG. 6C is a side view of the partitioned shaker pan of FIG. 6B.
Figure 6D:
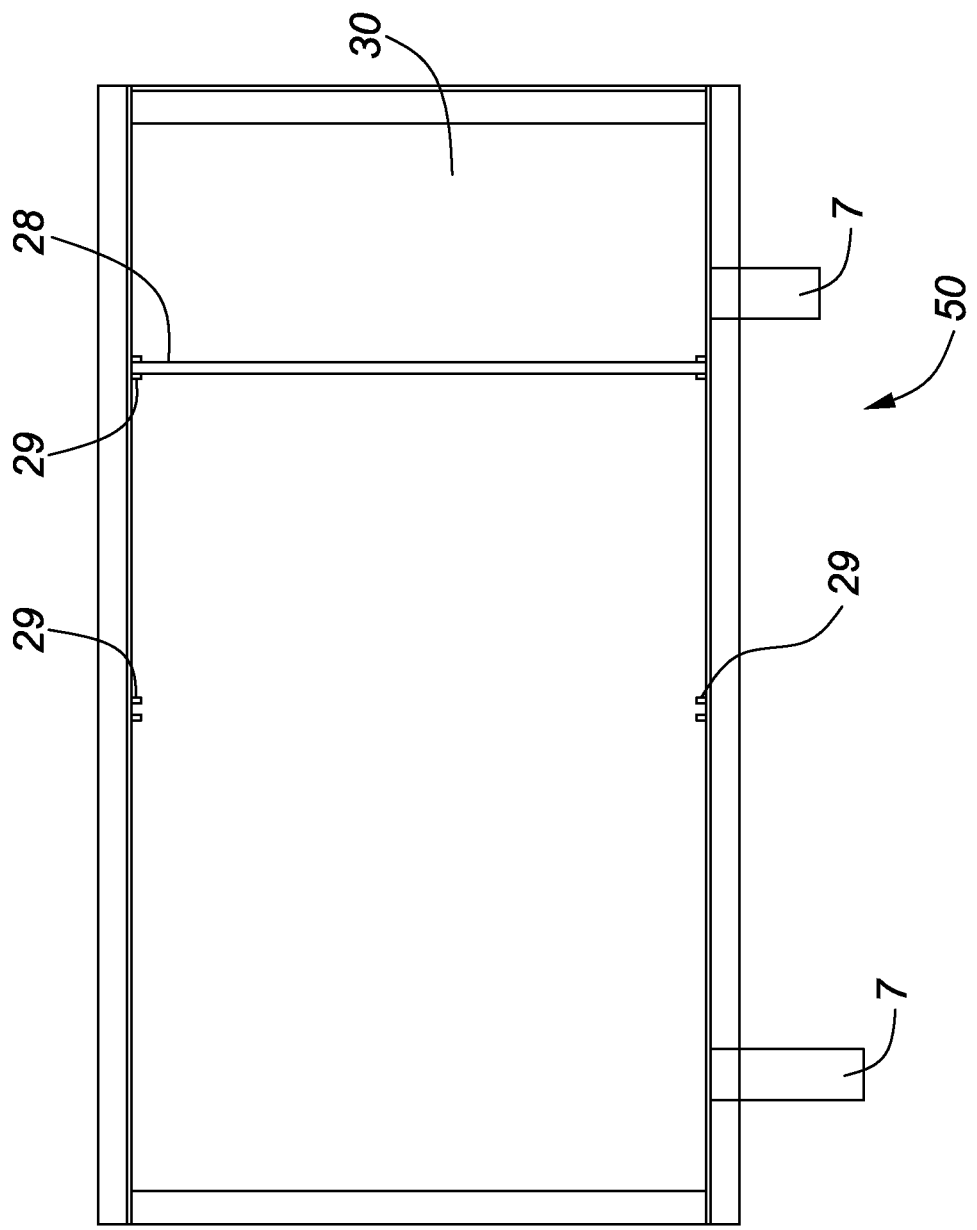
FIG. 6D is a plan view of the partitioned shaker pan of FIG. 6B.
Figure 6E:
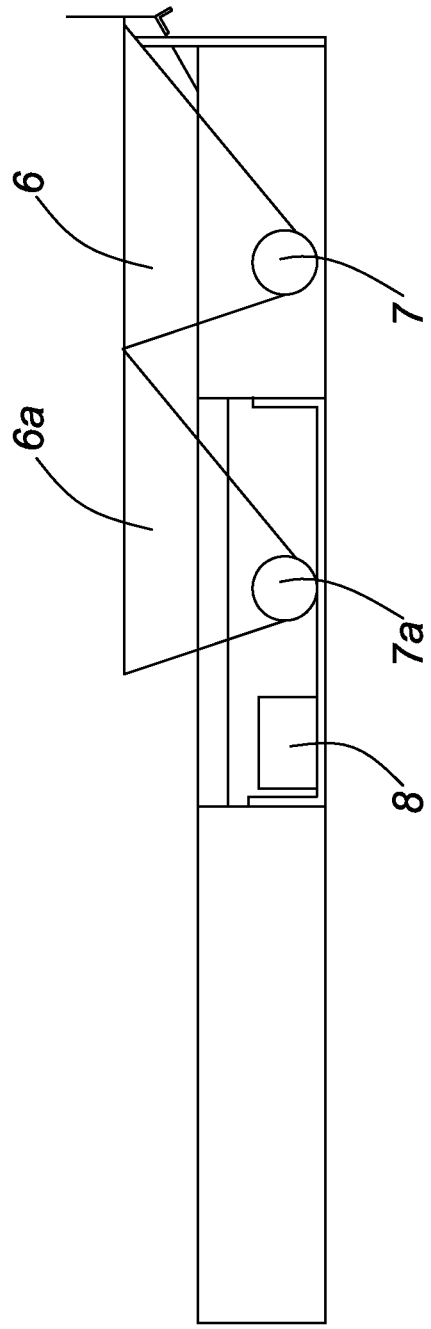
FIG. 6E is a side view of a separated fluid collection system in accordance with one embodiment of the invention.

FIG. 6A is also illustrative of a complete separation system including a partitioned shaker, MEU 12a, vacuum system 20 and secondary fluid treatment system 60. As shown, a shaker has been retro-fit with an extended screen in which the extended portion has been configured with a vacuum manifold 12. A hopper 6 is shown configured to the shaker towards the downstream end of the shaker and a separate fluid collection system 30 is provided upstream of the hopper. In this embodiment, drill cuttings are introduced towards the upstream end of the shaker and allowed to progress towards the downstream end.

In the upstream sections, the shaker is normally configured with finer screens thereby generally preventing the passage of coarse particles through the screens but also limiting the passage of drilling fluid through the screens. Drilling fluid collected from these sections from the shaker pan 30 through piping 26a, due to the general absence of solid particles can be immediately returned to "clean" drilling fluid tank 26 for re-use in the well through piping 27.

Within the shaker, a coarser screen is positioned above hopper 6 such that both a greater proportion of drilling fluids and coarse solids will pass through this screen section. As the recovered fluid will contain a higher proportion of solids, secondary fluid separation will generally be required. As such, these fluids are collected in "dirty" drilling fluid tank 19 for secondary treatment. Fluid from tank 19 is pumped to centrifuge 24 through centrifuge piping 24a for solids/fluid separation. Upon separation, cleaned fluid is delivered to clean drilling fluids tank 26 and solids 23 are removed. As the centrifuge will generally be required to separate a smaller proportion of the overall quantity of recovered drilling fluid, the centrifuge can generally be smaller compared to a centrifuge in which all recovered drilling fluid required was subjected to secondary separation. Hence, significant operational efficiencies can be realized.

In addition, the system may also include a vacuum system 20 to provide final treatment to drill cuttings exiting the shaker 10. The screen size in this section will generally be equivalent to that of the immediately upstream section of the shaker but may also be finer as the drill cuttings passing over this section are subjected to a greater separation force (due to the applied vacuum). In FIG. 6A, the shaker is shown configured with an MEU 12a although this may not be necessary for a specific shaker.

Fluids recovered from the MEU region of the shaker will generally be returned to dirty tank 19, although if a fine screen can be run on the MEU, these fluids could be returned directly to the clean tank 26. Other pumps (not shown) may be utilized to ensure appropriate movement of fluids.

Variations in the specific designs can be implemented based on the observed operating conditions in accordance with the general principles described above and as would be understood by those skilled in the art. For example, while the foregoing description primarily details retro-fitting an existing shaker to include additional functionality, it is understood that the above functionality can be incorporated into original equipment.

Examples

Importantly, the above systems provide an effective method of separating drill cuttings from drilling fluid without significant detrimental effects to the recovered drilling fluid quality.

For the purposes of illustration, a representative drilling fluid was evaluated to determine the effectiveness of different separation techniques on the properties of the recovered drilling fluids. The following data was obtained from samples of EDSI 4G oil mud (Engineered Drilling Solutions Inc., Calgary, Alberta) as used in drilling a typical well. Drilling fluid was recovered from the well and passed over a shaker having a retrofit vacuum-screen. The drilling fluid recovered from the vacuum screen was recovered and samples retained for testing (termed "vacuum screen sample"). The recovered drilling fluid was then subjected to a secondary separation technique using a decanting centrifuge and samples recovered from the centrifuge device were retained for testing (termed "centrifuge sample"). A further sample (termed "base sample") of drilling fluid recovered from beneath the shaker screens was collected for comparison to the vacuum screen sample and centrifuge sample.

Table 1 and FIGS. 7-13 shows various properties of each sample:

TABLE 1

Weighted Oil Mud Properties
Oil mud tests on samples from Suncor P-30-Barite Weighted Drilling Fluid

| Samples | Base Sample | | Vacuum Screen Samples | | Centrifuge Sample | |
| --- | --- | --- | --- | --- | --- | --- |
| Properties | | | | | | |
| Density | 1260 kg/m³ | | 1285 kg/m³ | | 1020 kg/m³ | |
| Retort | | | | | | |
| Solids | 16.00% | 584 kg/m³ | 16.00% | 592 kg/m³ | 6.50% | 262 kg/m³ |
| Water | 5.00% | 50 kg/m³ | 3.00% | 30 kg/m³ | 2.00% | 20 kg/m³ |

TABLE 1-continued

Weighted Oil Mud Properties
Oil mud tests on samples from Suncor P-30-Barite Weighted Drilling Fluid

| Samples | Base Sample | | Vacuum Screen Samples | | Centrifuge Sample | |
|---|---|---|---|---|---|---|
| Oil | 79.00% | 646 kg/m$^3$ | 81.00% | 663 kg/m$^3$ | 91.50% | 748 kg/m$^3$ |
| Oil/Water | 94/6 | | 96.5/3.5 | | 97.9/2.1 | |
| ASG Solids | | 3524 kg/m$^3$ | | 3703 kg/m$^3$ | | 3870 kg/m$^3$ |
| High Gravity Solids | | 323 kg/m$^3$ | | 418 kg/m$^3$ | | 209 kg/m$^3$ |
| Low Gravity Solids | | 241 kg/m$^3$ | | 174 kg/m$^3$ | | 43 kg/m$^3$ |
| Rheology | | | | | | |
| Viscometer (RPM) | | Variation to next set | | Variation to next set | | |
| 600 | 41 | −19.51% | 33 | −19.70% | 26.5 | |
| 300 | 26 | −28.85% | 18.5 | −16.22% | 16.5 | |
| 200 | 20 | −30.00% | 14 | −14.29% | 12 | |
| 100 | 14 | −35.71% | 9 | −11.11% | 8 | |
| 6 | 4.5 | −55.56% | 2 | 25.00% | 2.5 | |
| 3 | 4 | −60.00% | 2 | 0.00% | 2 | |
| Bingham Properties | | | | | | |
| Plastic Viscosity | 15.0 mPa·s | −3.33% | 14.5 mPa·s | −24.14% | 11.0 mPa·s | |
| Yield Point | 5.2 Pa | −63.64% | 1.9 Pa | 12.50% | 2.1 Pa | |
| Gel 10$^+$ | 2.4 Pa | −40.23% | 1.4 Pa | 0.00% | 1.4 Pa | |
| Gel 10' | 3.8 Pa | −25.00% | 2.9 Pa | 0.00% | 2.9 Pa | |
| Apparent Viscosity | 0.021 Pa·s | −19.51% | 0.017 Pa·s | −19.70% | 0.013 Pa·s | |
| PV/YP Ratio | 2.859 | 185.83% | 7.600 | −32.57% | 5.125 | |
| Power-Law Properties | | | | | | |
| n (600/300) | 0.6571 | 27.05% | 0.8349 | −7.33% | 0.7737 | |
| n (300/200) | 0.6471 | 6.23% | 0.6874 | −8.17% | 0.6312 | |
| n (200/100) | 0.6148 | 23.88% | 0.6374 | −8.23% | 0.5850 | |
| n (100/6) | 0.4034 | 32.52% | 0.5346 | −22.67% | 0.4134 | |
| K (300) | 0.432 Pa·s | −76.53% | 0.101 Pa·s | 22.73% | 0.124 Pa·s | |
| K (200) | 0.460 Pa·s | −44.67% | 0.254 Pa·s | 18.94% | 0.303 Pa·s | |
| K (100) | 0.995 Pa·s | −65.80% | 0.340 Pa·s | 16.39% | 0.395 Pa·s | |
| Emulsion Stability | | | | | | |
| Probe 1 (060) | 1081 Volts | 23.96% | 1340 Volts | 45.82% | 1954 Volts | |
| Probe 2 (060) | 1580 Volts | 28.21% | 2000 Volts | 0.00% | 2000 Volts | |
| Probe 3 (030) | 940 Volts | 72.34% | 1620 Volts | 28.89% | 2088 Volts | |
| Average | 1194 Volts | 38.51% | 1653 Volts | 21.81% | 2014 Volts | |
| HP-HT Filter Press Results 500 psi 100° C. | | | | | | |
| Volume Cake | | | | | | |

The (x.xxx) values in the Probe section are the Probe Gaps. 0-2000 volt probes are 0.0600-4000 volt probes are 0.030. Voltage values of 2000 with a 0.060 probe mean the meter maxed out indicating a higher value then 2000 volts existed.

The variations shown in Table 1 and FIGS. 7-13 between samples are both expected and unexpected results in terms of the fluid properties.

For example, for the vacuum-screen sample, an unexpected increase in emulsion stability, viscosity reduction and high gravity solids to low gravity solids ratio was observed. These results are unexpected particularly as the density of the vacuum-screen sample was higher. While an increase in density was expected, it was also observed that the ratio of high-gravity:low-gravity particles from the base sample to vacuum-screen sample increased, thus suggesting that the weighting agent (barite) was being pulled through the screen and the increase in density was not simply drill cutting fines passing through the screen. Normally, it would be expected that fines within the recovered fluid (i.e. fluid passing through the screen) would result in an increase in density (due to the low gravity solids and fines) and an increase in viscosity as a result of a decrease in emulsion stability (in the case of an invert emulsion oil based fluid) by decreasing performance of the emulsifiers. The decrease in observed viscosity, particularly with the simultaneously observed increase in emulsion stability suggests that a stronger emulsion is being formed by the action of the vacuum screen. In particular, it is believed that the increase in emulsion stability is being caused by the oxidation of emulsifiers in the drilling fluid that can lead the polymerization of the emulsifiers (i.e. dimers, trimers, etc. of the emulsifiers).

An increase in emulsifier performance explains improved emulsion stability and suggests a decrease in water droplet size within the solutions. A decrease in water droplet size suggests less water available to form hydrogen bonds that may affect the ability of the solution to form viscosity.

Thus, in summary, it can be concluded that the properties of the vacuum-screen fluid does not adversely affect the recovered drilling fluid when it is returned to the system thus providing the advantage of reducing and/or minimizing the need to add additional drilling fluid chemicals to the re-blended drilling fluid. In particular, the improved properties minimize and/or eliminate the need for emulsifier addition to the re-blended drilling fluid. In addition, the properties of the recovered vacuum-screen fluid are also beneficial to the downstream performance of various secondary separation systems such as a centrifuge.

Figure 7:
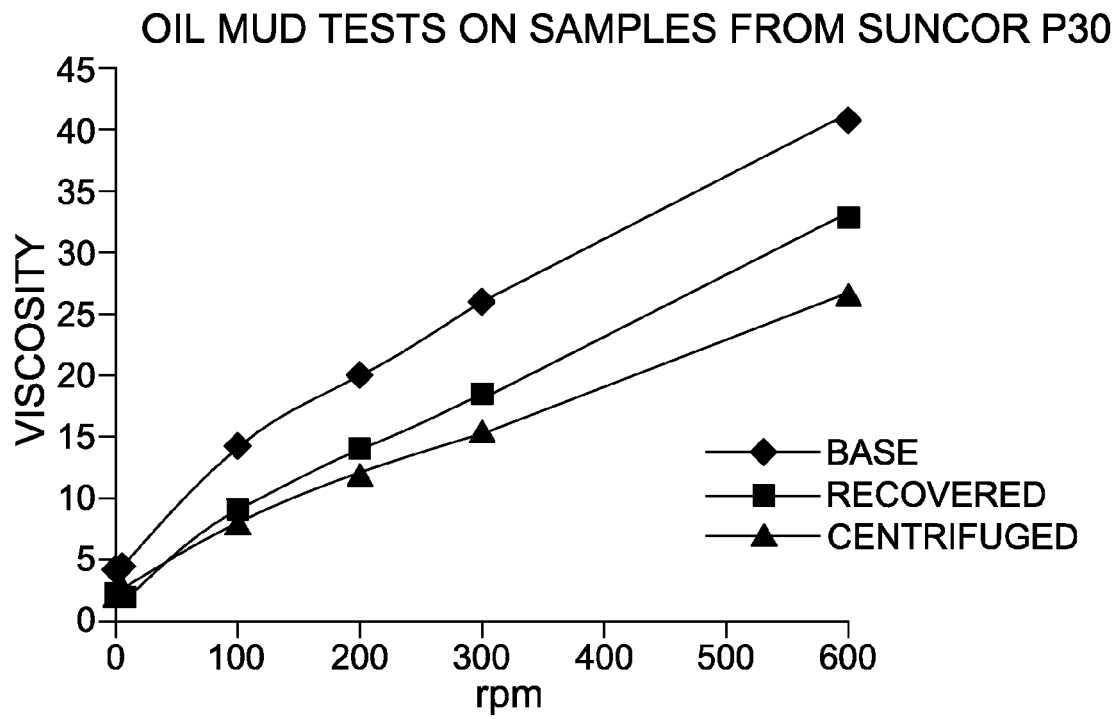
FIG. 7 is a graph of the viscosity of a base, vacuum-screen and centrifuged drilling fluid at varying rpm.

As noted, the above is observed from FIGS. 7-13. As shown in FIG. 7, the vacuum-screen sample had a lower relative viscosity reading when measured with a Fann 35 Viscometer than the base fluid.

Figure 8:
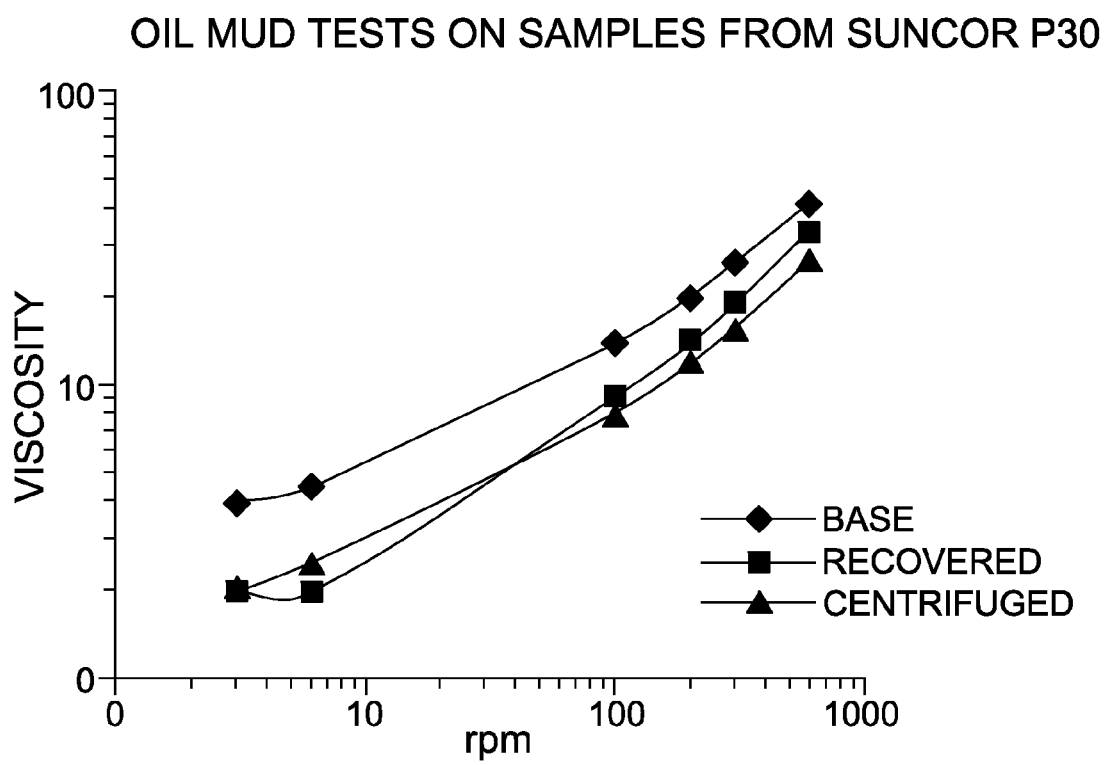
FIG. 8 is a log-log graph showing the viscosity of a base, vacuum-screen and centrifuged drilling fluid at varying rpm.

FIG. 8 shows the relative viscosity curves from the Fann 35 Viscometer plotted on a log/log scale and show that all three fluids show a good correlation to power-law fluid models.

Figure 9:
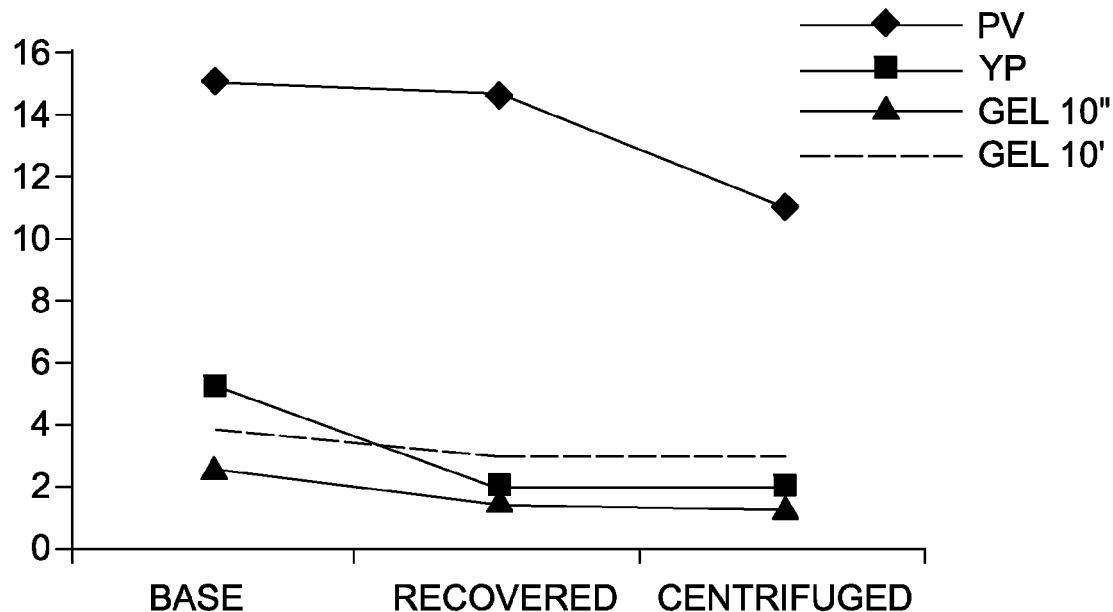
FIG. 9 is a graph showing the plastic viscosity, yield point and 10 minute and 10 second gel times of a base, vacuum-screen and centrifuged drilling fluid.

FIG. 9 shows the Bingham properties of the fluids as well as the 10 second and 10 minute gel strengths. In vacuum-screen separation systems, one would normally expect an increase in these fluid property values and not a decrease as shown. The observed results can be explained due to effects as described above.

Figure 10:
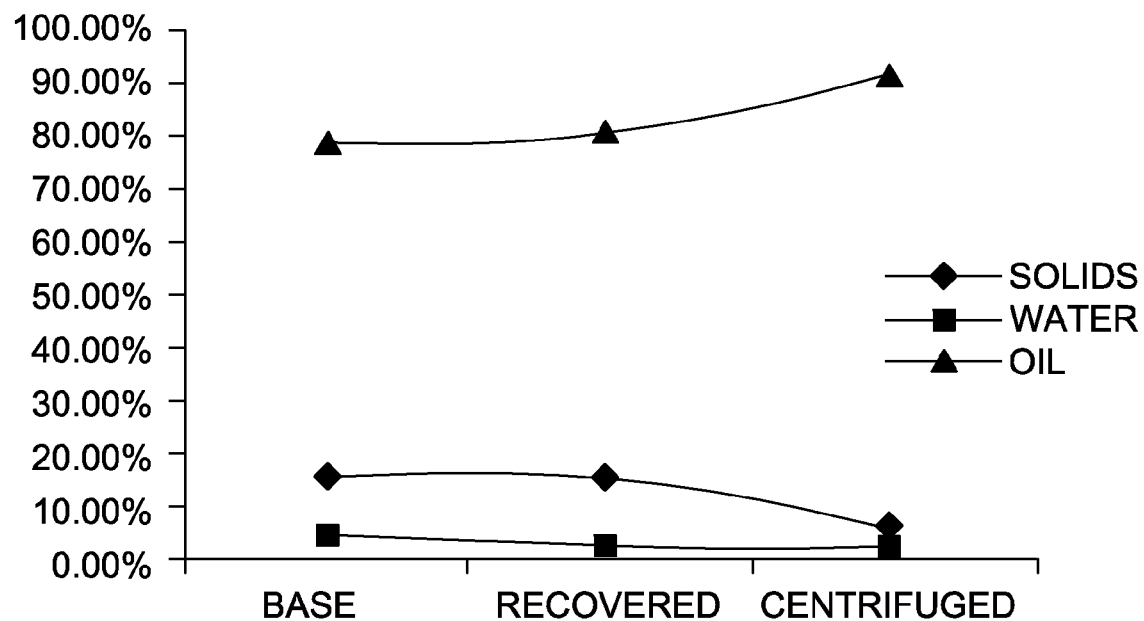
FIG. 10 is a graph showing the solids distribution of a base, vacuum-screen and centrifuged drilling fluid.
Figure 11:
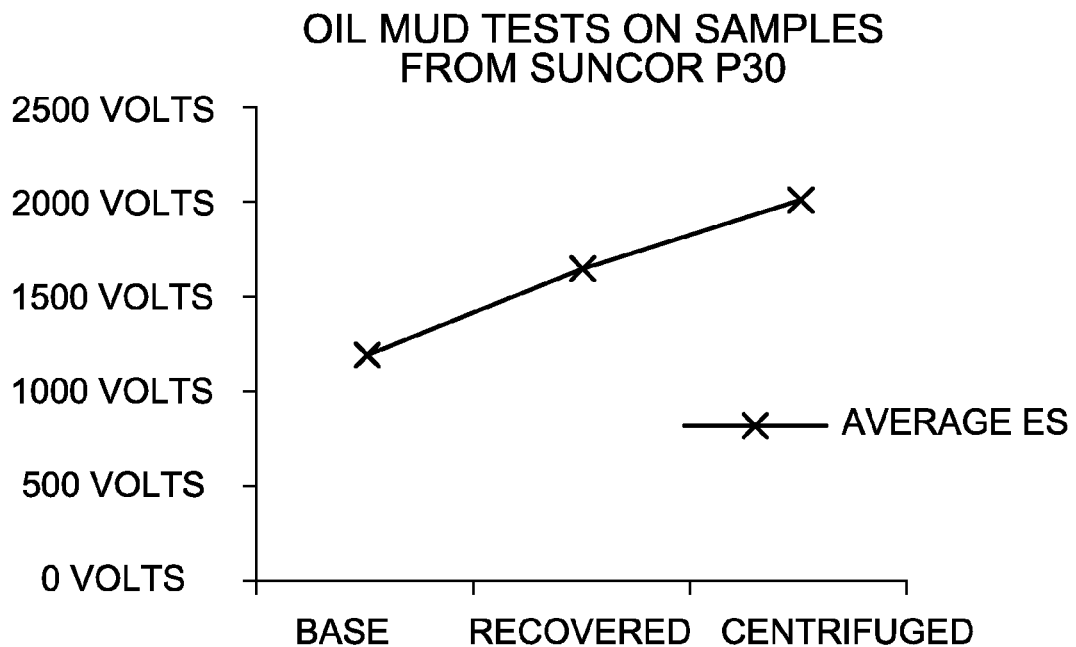
FIG. 11 is a graph showing the emulsion stability of a base, vacuum-screen and centrifuged drilling fluid.

FIG. 10 illustrates the results from the distillation of the fluids tested. As noted above, the vacuum-screen sample was heavier as expected and had a lower water content which may be attributed to the effect of the vacuum partial pressure causing the water to evaporate.

FIG. 1 shows the emulsion stability readings; namely voltage values required to break the emulsion. As noted above, the higher weight of the vacuum-screen sample would have been expected to result in a decrease in emulsion stability, where an increase occurred. The observed results can be explained due to effects as described above.

Figure 12:
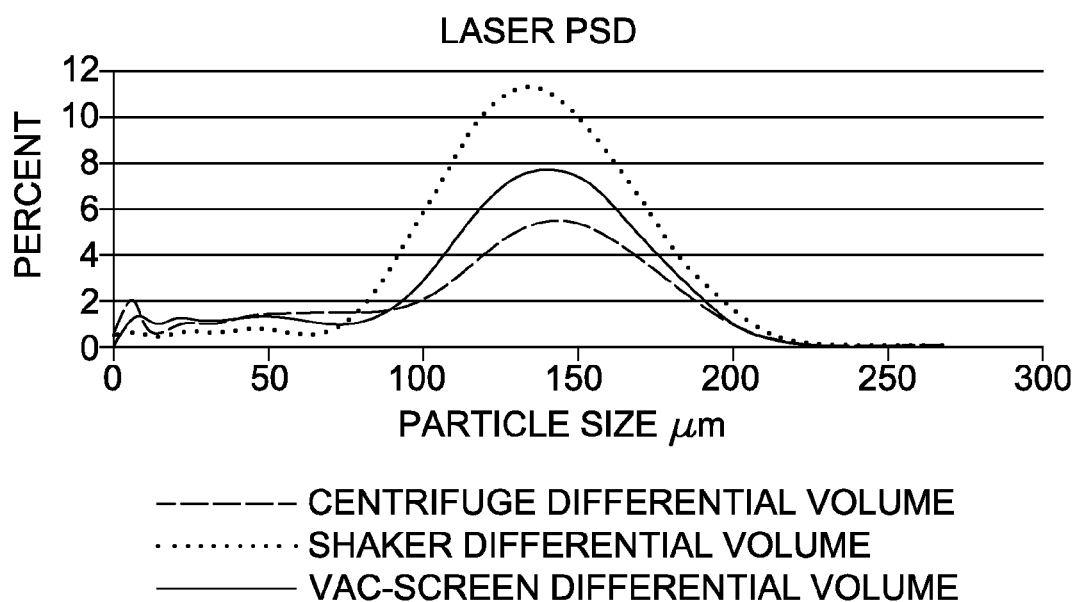
FIG. 12 is a graph showing the particle size distribution of a base, vacuum-screen and centrifuged drilling fluid.
Figure 13:
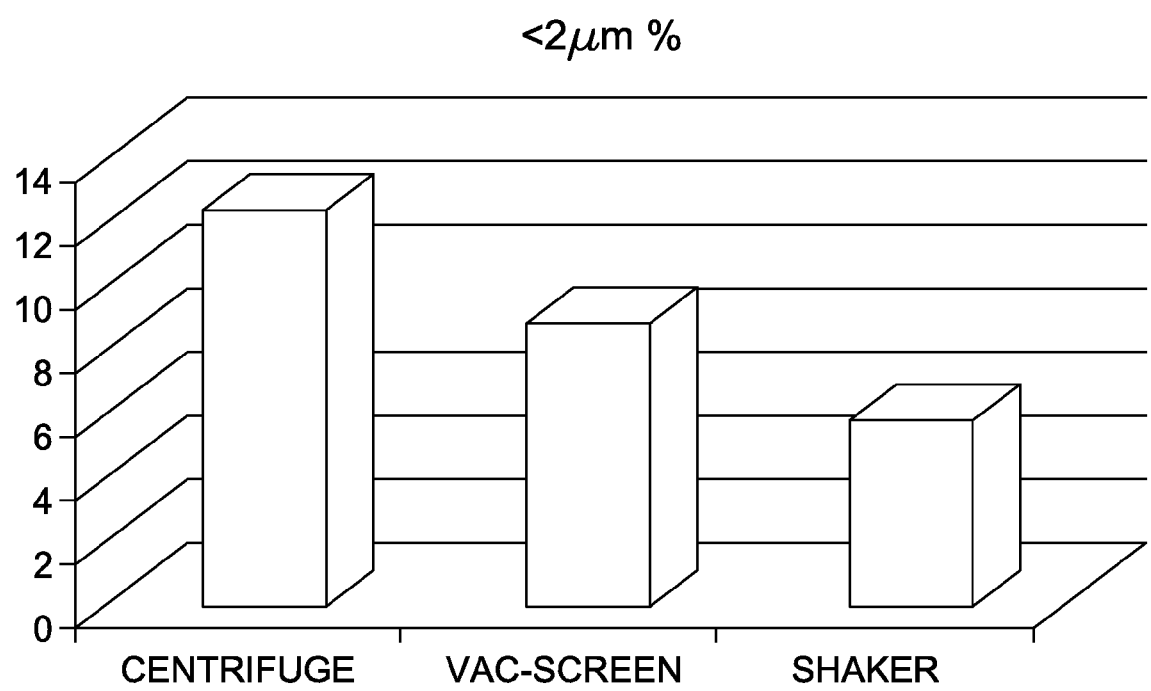
FIG. 13 is a graph showing the particle size distribution (<2μm) of a base, vacuum-screen and centrifuged drilling fluid.

FIG. 12 shows the results of laser particle size analysis of the fluids. The slightly higher relative levels of fines in the recovered and centrifuged fluids are expected because most of the larger particles have been removed thereby changing the relative concentrations. However, the low peak for the 75-200 micron particles for the vacuum-screen recovered fluid is unexpected. The slightly higher levels of fines for the centrifuge and vacuum-screen samples are likely related to both barite and clay presence, with the clay presence being illustrated in FIG. 13.

Further Data

As discussed above, testing was also conducted where the final screen(s) subjected to the vacuum were significantly coarser than the screens preceding its/their position on the shaker deck as a mechanism of optimizing the overall solids control program during drill cutting recovery.

Table 2 shows various examples of different screen, partition and vacuum configurations with corresponding screen sizes at up to five different positions on the shaker. The upstream position is position 1 and the downstream position in position 5.

TABLE 2

Examples of Screen Sizes (mesh size) for Different System Configurations

| \multicolumn{5}{c}{Position} | |
| --- | --- | --- | --- | --- | --- |
| 1 | 2 | 3 | 4 | 5 | Configuration |
| 250 | 250 | 250 | 250 | 84 | External Vacuum |
| 250 | 250 | 250 | 150 | | Partition Only |
| 250 | 250 | 250 | 200 | 84 | Partition and External Vacuum |

Importantly, Table 2 indicates that the system can be implemented in a number of configurations depending on the specific requirements of an operator and the specific drilling fluids and solids control equipment available.

For example, in the first configuration, using an external vacuum (i.e. MEU), fine screens are run across the shaker deck where the MEU utilizes a coarse screen. This configuration may be desired when the drilling fluid is a more expensive drilling fluid and the operator therefore desires more effective final collection of drilling fluid. In this case, fluid collected from positions 1-4 may be immediately re-used without additional solids control and the portion collected from position 5 subjected to secondary solids control.

In the second example, where the system employs no vacuum and only one or more partitions, for example between positions 3 and 4, the drilling fluid may be of a lower value and, hence, overall fluid recovery may not be of the same importance as with the first case.

In the third case, the system may be set-up with both partitions and vacuum for situations where the operator may require further refinement of the separation stages depending on the performance/availability of the secondary separation equipment. For example the first partition fluids may go directly back for reuse whereas, the second partition fluids may be subjected to a first form of secondary processing and third partition fluids (i.e. the vacuum fluids) may be subjected to a different secondary processing process.

Manifold Volume

The volume of the manifold also has an effect on the operational performance of the system. Specifically, it has been determined that manifolds having a shallow depth may cause cuttings to freeze on the screen bed even with a low vacuum pressure. It is understood that a low volume manifold may cause inconsistent air flow through different regions of the screen and, hence, cause freezing. Hence, it is generally desirable to ensure that the manifold has sufficient volume to prevent inconsistencies in air flow through the screen. It is further understood that air flow directors may be included within a manifold to effectively disperse the vacuum, however such tools would significantly increase the complexity and cost of such manifolds.

Minimizing Cuttings Damage

As noted above, in order to minimize fracture damage and disintegration of the cuttings on the shaker, it is important that the fluid on the shaker generally flow the full length of the shaker deck and that the height of the fluid above the screens decreases to a low level prior to contacting the vacuum screen. This will ensure that the cuttings are protected from disintegration by a fluid cushion and also allows for the operator to run finer screens which improves the primary separation of the drilling fluid.

Airflow Rates

Airflow rates for the vacuum screen should generally only be sufficient to overcome surface tension of the fluid on the screen. As such, the amount of airflow should vary with the screen size opening and fluid surface tension. Procedurally, at startup, air flow should generally start at a lower flow rate/pressure (eg. typically about 1 inch of vacuum) and be increased to a level where the screens appear to be clean. Appear to be clean generally means that air flow is minimally lower than the air flow that would cause cuttings to freeze on the screen. Generally, the visual appearance of the underlying frame support is a good indication that an optimal air flow is being utilized.

In a typical operation, where vacuum is being applied to an 84-140 mesh screen, about 5" Hg and 380 cfm of airflow through the screen with a two manifold system is typical.

Mode of Action

Figure 14:
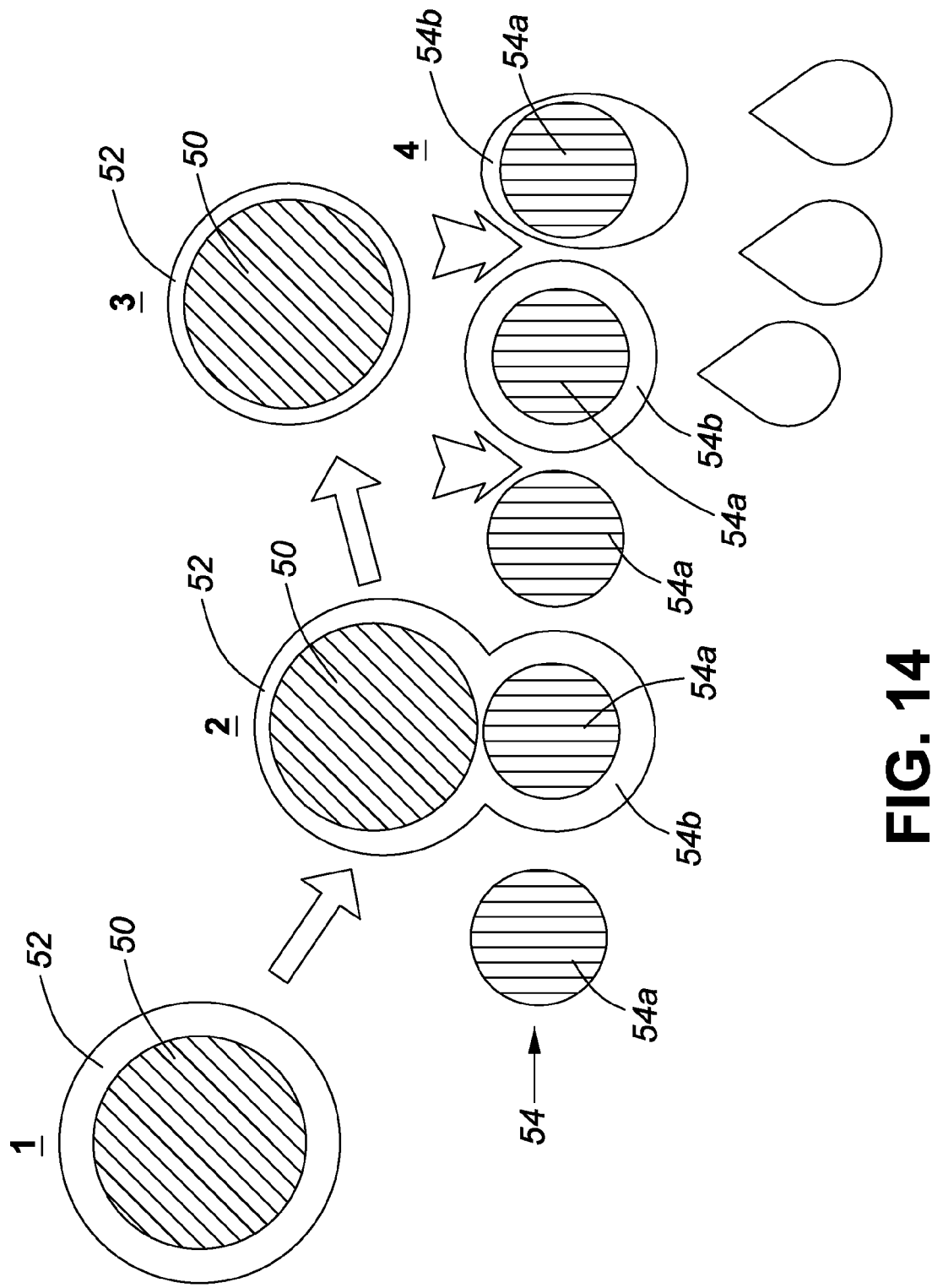
FIG. 14 is a sketch showing the basic interaction of drill cuttings with a screen having a vacuum system in accordance with the invention; and, FIG. 15 is a graph showing the relative vacuum required to overcome surface tension of a number of different fluids at various screen mesh sizes.

Generally, the system is operated to improve the performance of the shaker and its screens by facilitating the effectiveness of the mechanical action of the shaker in causing drill cuttings to contact a screen. More specifically, the subject system assists in overcoming the surface tension forces acting between drill cuttings, drill fluid and the screen wires by the vacuum. As shown in FIG. 14, the interaction of a typical drill cutting with a screen is described. In FIG. 14, a typical drill cutting is represented as a sphere 50 with a film 52 of fluid surrounding it. A screen 54 having a plurality of wires 54a with openings 56.

At position 1, the drill cutting is above a "dry" screen wire wherein the surface tension forces of the fluid on the cutting has substantially created a uniform coating 52 around the drill cutting. At position 2, the drill cutting has interacted with the screen, due to a combination of gravity and mechanical agitation of the sphere against the screen. That is, as the drill cutting and screen come into contact, drilling fluid is displaced from the point of contact and subjected to shearing forces such that a portion of the displaced fluid, in seeking a lower chemical potential, will flow around the screen wire to coat the screen wire. At position 3, as the drill cutting breaks away from the screen as a result of mechanical agitation (and other fluid forces), a portion of the drilling fluid 54b has then been effectively transferred to the screen. At position 4, the flow of air through the screen places a force on the screen wire that will actively draw the fluid off the screen by breaking the surface tension adhesion of the fluid on the screen. Importantly, the screen is then effectively cleared of fluid allowing new drill cuttings particles to repeat the foregoing process. As the vacuum is preferably located adjacent the end of the screen, there is then limited opportunity for stripped drill cuttings to abrade with one another before exiting the screen.

In addition, there may also be small electrostatic forces acting between the screen and any polar molecules in the fluid that may be created by the flow of air over the screen that may assist in the transfer of fluid to the screen.

Figure 15:
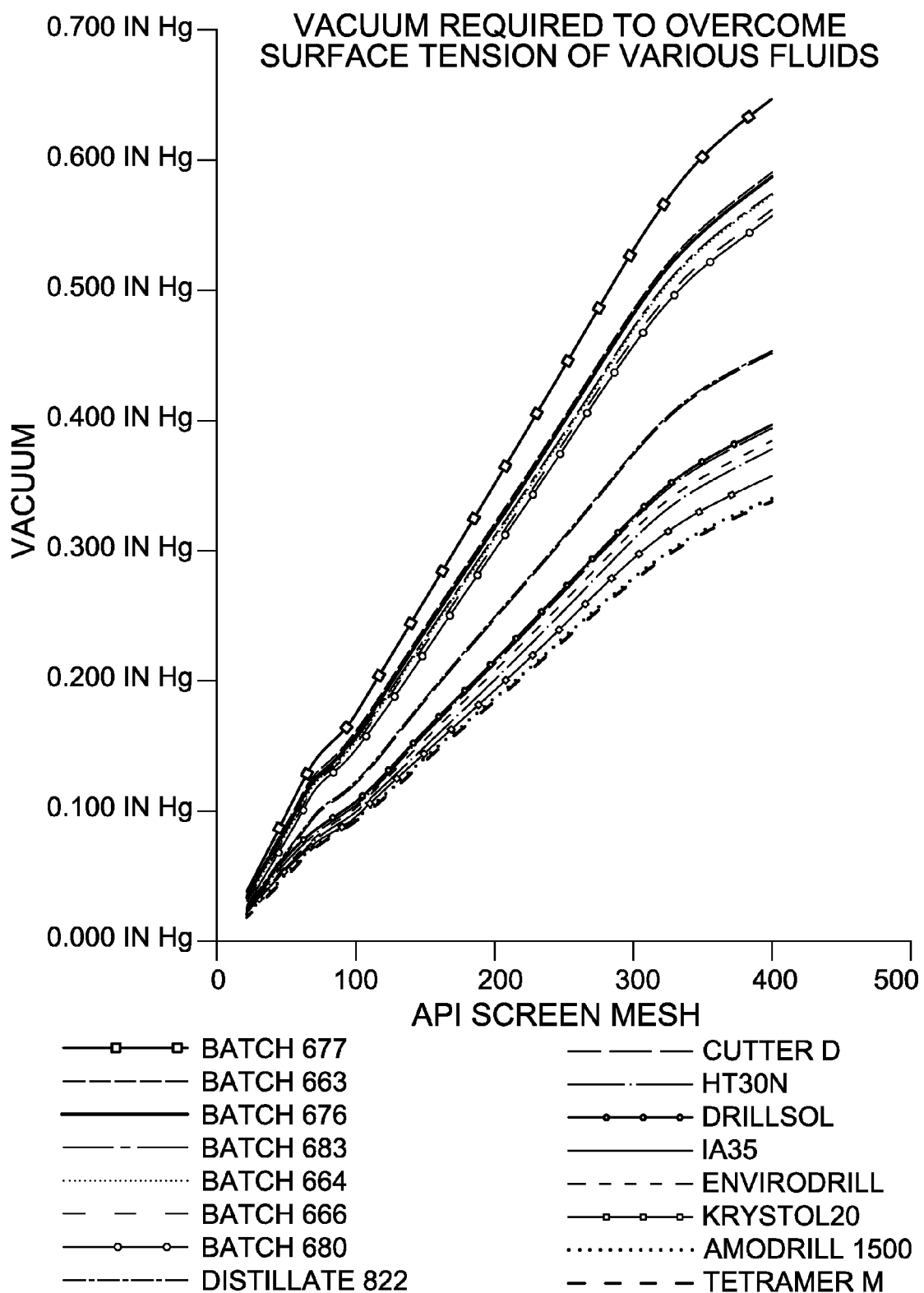

FIG. 15 is a graph showing the relationship between vacuum pressure required to pull different fluids through different mesh screens as calculated from known surface tension equations. As can be seen, there are differences in the minimum vacuum required to draw different fluids through a screen and, hence, the actual vacuum used in the field must be adjusted to accommodate these differences.

It is also important that when a screen mesh size is changed, that the cuttings flowing over the screen be monitored for plugging or blinding effects. In other words, it is important that the airflow is tuned to accommodate surface tension changes when screen mesh sizes are varied. Further still, changes in screen size will result in a change of recovered particle size which can, absent other adjustments, mean that the frequency and amplitude of the shaker may not accelerate the particles sufficiently to overcome the vacuum with the result being that screen plugging may occur.

Controlling Vacuum at the Manifold

In order to further control the operation of the system, the position of vacuum bleed-off (100, FIG. 2) can also affect the performance of the system. For example, when a vacuum bleed-off valve is located close to the manifolds (or within the manifolds), fine-tuning of the vacuum at the manifold and air flow through the screen can be controlled such that the vacuum pump can be operated at a fixed rate while fine control can be maintained by an operator close to the vacuum screen. In addition, by positioning the bleed-off valve close to the manifold, the risk of plugging the vacuum hoses by accumulated solids can be reduced as a higher velocity flow downstream of the bleed-off valve can be maintained.

More specifically, the bleed-off valve 100 can be controlled to ensure that there is a relatively high velocity of air through substantially the entire length of hose 16 leading from the manifold to the vacuum system while being able to finely control the flow of air through the screens. As such, it should be noted that in normal operation, the vacuum system will be positioned at the drill site at a lower position relative to the manifold/shaker such that gravity will assist in the movement of recovered fluids/solids from the manifold to the tanks 19, 26. However, various on-site restrictions may result in deployment of equipment in less than ideal locations or configurations such that plugging of piping by solids can occur. This is particularly likely in the event that the relative vertical distance between the manifold and the tanks is low and/or the relative length of the piping is relatively high. For example, an operator may set an initial and relatively high vacuum pressure that would otherwise cause freezing of drill cuttings on the screen. As freezing cuttings on the screen is undesirable, by adjusting the bleed valve, air flow behind the screen may be introduced into the manifold so to reduce the air flow through the screen, thereby preventing freezing of cuttings on the screen but maintaining the same air flow through the piping. As the fluids recovered from the screen will include a proportion of solids within the recovered fluid, the relatively high air flow can be controlled to ensure sufficient turbulence within the pipe to ensure that settling will not occur that could lead to clogging of the piping. Moreover, the location of the bleed valve at or adjacent the manifold ensures that the operator is in close visual contact with the shaker such that relevant observations can be made about the consistency of the materials flowing off the shaker.

Degassing

The present system also provides further advantages in the handling of various gases that may be liberated as the drilling fluid and drill cuttings are transiting the shaker that can provide a number of safety and operational advantages over past systems. In addition, the subject system may also be used as an effective indicator of the location of gas bearing zones being drilled by providing feedback of gas concentrations in the well.

In the past, in cases where gases are being liberated from the drilling fluid at the shaker, and once operators are aware of this release they would have no control or ability to manage this gas flow at the shaker except to temporarily by-pass the shaker and send fluid and gas through gas/liquid separation equipment in the event that unsafe concentrations of gases are present. In either case, these situations can present explosion and/or health hazard to operators in addition to operational inefficiencies when equipment is not being used optimally.

In addressing these problems, with the subject system, heavier than air gases that are liberated from the drilling fluid can be substantially collected within the vacuum system as a result of the flow of air through the screen into the manifold thus controlling the collection and dispersion of those gases. That is, upon entering the vacuum system (which includes a fluid/gas separation tank system 20a) where liquids and gases are separated, the collected gases from the shaker will be withdrawn through the vacuum pump where they can be more safely vented to atmosphere away from rig personnel or in some other controlled manner.

In addition, other advantages can be realized by collecting gases in this manner. For example, the vacuum system, due to the flow of air through the screen provides additional shear forces to any bubbles within the drilling fluid that may otherwise not be broken up by passage over the shaker. Further, the vacuum system also exposes the fluids to higher turbulence and higher vacuum pressures which collectively can result in a more complete gas/fluid separation.

Improved gas/fluid separation and associated concentration data from that separation can be used to provide operators with useful information concerning the ongoing drilling. That is, the vacuum system can be configured with a gas sensor that provides effective data concerning the concentration of gases being collected from the shaker which can then be used to get a more accurate picture of the position of the drill bit relative to the gas bearing formation being drilled. For example, as drilling progresses through non-pay zones, the gas concentration within the drilling fluid will generally be lower than the gas concentration within the drilling fluid as the drill bit passes through a pay-zone. In passing a pay-zone where gas pressure will lead towards the saturation of drilling fluid with gas, accurate recovery and monitoring of the gas concentration and profile can provide effective evidence of the drill bit reaching a pay-zone. In the past, gas concentration at the shaker could not be accurately monitored and hence could not be used to provide accurate information about the position of the drill bit. In contrast, the subject system, due to the high degree of gas/liquid separation within the vacuum system can provide a more accurate picture of the gas recovered from the drilling fluid and, hence, provide a more accurate indication a sudden rise in gas concentration that may provide evidence of a pay-zone.

These capabilities are further enhanced by those systems having the bleed valve system described above, which results in highly turbulent gas/liquid low in the piping leading to the vacuum system. The high turbulence will generally cause the formation of small droplets of liquid within the flowing gases within the piping prior to entering the fluid/gas separator 20$a$ and vacuum system 20 which enhances the mass transfer of gas from the liquid as a result of the smaller droplet sizes as well as the higher differential pressure (eg. 28 mmHg within the vacuum system compared to a typical 1-3 mmHg at the screen) within the vacuum system.

Upon reaching the fluid/gas separator, the fluid/gas separator will cause the droplets/mist to coalesce where the liquid is stored and the gas/air blend is vented in a diluted concentration (typical 10:1 dilution) to the atmosphere. The recovered degassed fluid can then be discharged back into the fluid system as described above.

In a typical installation, the vacuum system can capture and store approximately 1-2 $m^3$ of fluid/minute (based on a typical tank volume and operating pressures). Once the fluid/gas separator has been filled, the vacuum system will automatically turn off and the fluid contents will be automatically discharged by pumping the fluid from the fluid/gas separator to the secondary fluid separation system 60. The vacuum system will then automatically be turned on to capture more fluid.

Importantly, this system and methodology provides a significant advantage over conventional continuous-flow vacuum degasser systems insomuch as the subject system and methodology ensures that the degree of degassing of fluid entering the fluid/gas separator is substantially complete and consistent regardless of the quantity of dissolved gases that may be present in the drilling fluid. That is, by virtue of the substantial dilution of dissolved gases by the vacuum bleed system, the high pressure differential and the turbulence within the system, the system will ensure that the recovered drilling fluid is de-gassed. In comparison, other de-gassing systems that provide a constant flow may not be able to effectively degas to a consistent level particularly in the event of a gas "kick" from the wellbore. In these cases, if the conventional flow-through system has not completely de-gassed the drilling fluid, the gas-containing fluid may contaminate the surface system and subsequently the wellbore with gas containing fluid.

Further still, the subject system allows for continuous use of the shaker system and may prevent gassed or foamed fluid entry into the surface system equipment which can be detrimental to the operation of surface pumps including problems such as pump cavitations, solids build up in surface tanks, and the potential for gas cut drilling fluid to be reintroduced into the wellbore. As well, the reintroduction of gas cut fluid into the wellbore can induce well control problems such as blow-outs.

The topical headings are advisory only, and are not intended to limit the applicability of any reference. While some embodiments are discussed as being preferred, it should be understood that all embodiments discussed, in any portion of this document, whether stated as having advantages or not, form a part of the invention and may be combined and/or sub-combined in a consistent manner in accordance with the teachings hereof. Likewise, the disclosure herein is intended to disclose permissive combinations, sub-combinations, and attributes, and any language which appears to limit the scope of applicant's invention is intended to apply to the particular embodiment referenced, or as a permissive suggestion for implementation of other embodiments which with it may be consistently applied. The present disclosure includes details of a number of aspects, which may find independent utility, and therefore the present specification is not intended to be construed as being limited to the conjunction of the elements of the disclosure.

What is claimed is:

1. A system for improving the separation of drilling fluid from drill cuttings on a shaker, the shaker having a shaker screen and support system for supporting drilling fluid contaminated drill cuttings within a shaker; the system comprising:
    a first fluid collection system for operative positioning beneath the shaker screen and support system to collect drilling fluid from a first section of the shaker screen and support system; and,
    a second fluid collection system for retro-fit connection to the shaker including:
        a screen extension and screen operatively connected to the shaker screen and support system, the screen extension and screen extending beyond an original length of the shaker screen and support system; and
        a vacuum system operatively connected to the underside of the screen extension for subjecting the screen extension screen to vacuum pressure and for collecting fluid from the screen extension screen.

2. The system of claim 1 wherein the drilling fluid collected from each of the first and second fluid collection systems is processed independently of each another.

3. The system as in claim 1 wherein the shaker screen and the screen extension screen have different screen mesh sizes.

4. The system as in claim 1 wherein at least one of the first and second fluid collection systems includes a hopper.

5. The system as in claim 4 wherein the hopper is connected to the shaker screen and support system and shakes with the shaker screen and support system during operation of the shaker.

6. The system as in claim 1 further comprising a third fluid collection system for operative positioning beneath the shaker screen and support system to collect drilling fluid from a second section of the shaker screen and support system, and wherein the first section of the shaker screen, the second section of the shaker screen and the screen extension screen have different screen mesh sizes.

7. The system as in claim 6 wherein the first and third fluid collection systems are separated by a walled-partition.

8. The system as in claim 7 wherein the walled-partition is adjustable allowing an operator to adjust the relative size of each of the first and third fluid collection systems.

9. The system as in claim 1 further comprising a mist collection system operatively positioned above the shaker screen and support system to collect drilling fluid mist liberated from the operation of the shaker.

10. The system as in claim 9 wherein the mist collection system includes a dessicant.

11. The system as in claim 1 further comprising a primary separation tank operatively connected to the first fluid collection system wherein drilling fluid collected from the first fluid collection system is delivered to the primary separation tank; and a secondary separation tank operatively connected to the second fluid collection system wherein drilling fluid collected from the second fluid collection system is delivered to the secondary separation tank.

12. The system as in claim 11 wherein the shaker screen has a smaller screen size than the screen extension screen.

13. The system as in claim 11 wherein drilling fluid from the secondary separation tank is delivered to a secondary separation system for removal of solids.

14. The system as in claim 13 wherein drilling fluid from the secondary separation system is delivered to the primary separation system.

15. The system as in claim 13 wherein drilling fluid from the primary separation tank is re-used for drilling.

16. The system as in claim 11 wherein the vacuum system is operatively connected to the secondary separation tank.

17. The system as in claim 16 wherein the vacuum system includes a bleed valve for introducing a volume of air into the vacuum system for inducing turbulence in the vacuum system to enhance gas/liquid separation.

18. The system as in claim 16 wherein the vacuum system includes a gas/liquid separator having a gas sensor for detecting the concentration of formation gas within the drilling fluid.

19. The system as in claim 1 wherein the vacuum system includes a vacuum manifold for operative connection to the screen extension.

20. The system as in claim 19 wherein the vacuum system includes a vacuum bleed adjacent to or part of the vacuum manifold for adjusting the vacuum within the manifold.

21. A method of separating drill cuttings from drilling fluids on a shaker having a shaker screen comprising the steps of:
 a) subjecting drilling fluid and drill cuttings on first and second sections of a shaker screen to screen separation, wherein the second section is a screen extension and screen retrofit to the shaker extending beyond an original length of the shaker screen;
 b) subjecting at least a portion of drilling fluid and drill cuttings from the second section to vacuum separation;
 c) collecting drilling fluid from the first and second sections into first and second fluid collection systems, respectively.

22. The method as in claim 21 wherein the first and second sections have different screen sizes.

23. The method as in claim 21 further comprising the step of subjecting drilling fluid from the second fluid collection system to secondary separation to remove solids.

24. The method as in claim 21 wherein the vacuum separation is conducted through a coarser screen in the second section compared to a finer screen in the first section.

25. The method as in claim 24 further comprising the step of controlling air flow through the shaker screen to improve emulsion stability of drilling fluid recovered from the vacuum system.

26. The method as in claim 21 wherein the vacuum system includes a gas/liquid separator and a gas sensor and the method further comprises the step of monitoring the concentration of formation gas recovered from the drilling fluid.

* * * * *